United States Patent
Ishii

(10) Patent No.: US 9,414,316 B2
(45) Date of Patent: Aug. 9, 2016

(54) MOBILE STATION, RADIO BASE STATION, AND COMMUNICATION CONTROL METHOD

(71) Applicant: NTT DOCOMO, INC., Tokyo (JP)

(72) Inventor: Hiroyuki Ishii, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 14/701,876

(22) Filed: May 1, 2015

(65) Prior Publication Data

US 2015/0237582 A1 Aug. 20, 2015

Related U.S. Application Data

(63) Continuation of application No. 13/698,312, filed as application No. PCT/JP2011/060990 on May 12, 2011, now abandoned.

(30) Foreign Application Priority Data

| May 17, 2010 | (JP) | ................................ 2010-113691 |
| May 24, 2010 | (JP) | ................................ 2010-118833 |

(51) Int. Cl.
 *H04W 52/02* (2009.01)
 *H04W 88/06* (2009.01)
 *H04W 76/04* (2009.01)

(52) U.S. Cl.
 CPC ........ *H04W 52/0241* (2013.01); *H04W 76/048* (2013.01); *H04W 88/06* (2013.01)

(58) Field of Classification Search
 CPC H04L 1/0025; H04L 27/2647; H04W 76/048
 See application file for complete search history.

(56) References Cited

U.S. PATENT DOCUMENTS

| 8,184,599 | B2 | 5/2012 | Gholmieh et al. |
| 2009/0270103 | A1 | 10/2009 | Pani et al. |
| 2010/0142485 | A1 | 6/2010 | Lee et al. |
| 2010/0208674 | A1 | 8/2010 | Lee et al. |
| 2011/0002281 | A1* | 1/2011 | Terry ................ H04W 52/0216 370/329 |
| 2012/0051329 | A1 | 3/2012 | Hirano et al. |

FOREIGN PATENT DOCUMENTS

| WO | 2010/008837 A2 | 1/2010 |
| WO | 2010/109764 A1 | 9/2010 |

OTHER PUBLICATIONS

International Search Report issued in PCT/JP2011/060990 dated Jul. 26, 2011 (2 pages).

(Continued)

*Primary Examiner* — David Oveissi
(74) *Attorney, Agent, or Firm* — Osha Liang LLP

(57) ABSTRACT

A mobile station UE in accordance with an embodiment of the present invention is a mobile station for communicating with a radio base station using two or more carriers. The two or more carriers include a carrier in a non-discontinuous reception state and a carrier in a discontinuous reception state. The mobile station includes a first communicating unit configured to perform communications on the carrier in the non-discontinuous reception state and a second communicating unit configured to perform communications on the carrier in the discontinuous reception state. The first communicating unit treats intervals before and after an on-duration on the carrier in the discontinuous reception state as measurement gaps.

5 Claims, 12 Drawing Sheets

(56) References Cited

OTHER PUBLICATIONS

Written Opinion issued in PCT/JP2011/060990 dated Jul. 26, 2011 (4 pages).
3GPP TR 36.913 V8.0.1; "3rd Generation Partnership Project; Technical Specification Group Radio Access Network; Requirements for further advancements for Evolved Universal Terrestrial Radio Access (E-UTRA) (LTE-Advanced) (Release 8)"; Mar. 2009 (15 pages).
3GPP TS 36.213 V8.8.0; "3rd Generation Partnership Project; Technical Specification Group Radio Access Network; Evolved Universal Terrestrial Radio Access (E-UTRA); Physical layer procedures (Release 8)"; Sep. 2009 (77 pages).
3GPP TS 36.133 V8.7.0; "3rd Generation Partnership Project; Technical Specification Group Radio Access Network; Evolved Universal Terrestrial Radio Access (E-UTRA); Requirements for support of radio resource management (Release 8)"; Sep. 2009 (321 pages).
3GPP TS 36.321 V8.7.0; "3rd Generation Partnership Project; Technical Specification Group Radio Access Network; Evolved Universal Terrestrial Radio Access (E-UTRA); Medium Access Control (MAC) protocol specification (Release 8)"; Sep. 2009 (47 pages).
3GPP TS 36.331 V8.8.0; "3rd Generation Partnership Project; Technical Specification Group Radio Access Network; Evolved Universal Terrestrial Radio Access (E-UTRA); Radio Resource Control (RRC); Protocol Specification (Release 8)"; Dec. 2009 (211 pages).
Office Action issued in corresponding Chinese Application No. 201180035174.6, mailed on Dec. 2, 2014 (21 pages).
Huawei; "Further discussion on measurement in CA;" 3GPP TSG RAN WG4 Meeting Ad Hoc 2010 #02, R4-101375; Dublin, Ireland; Apr. 12-16, 2010 (4 pages).

\* cited by examiner

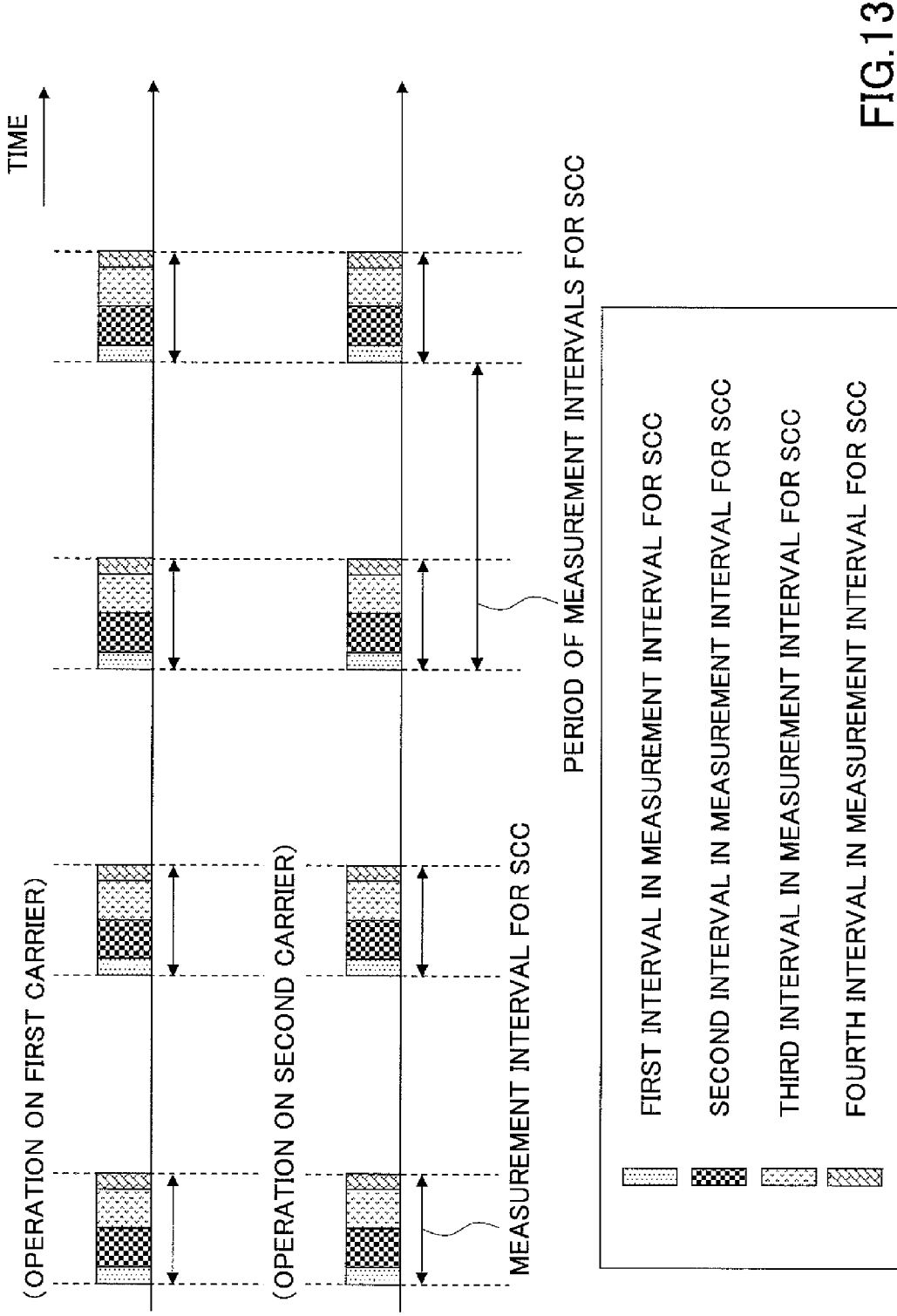

MOBILE STATION, RADIO BASE STATION, AND COMMUNICATION CONTROL METHOD

CROSS-REFERENCE TO RELATED APPLICATIONS

This is a continuation application of U.S. patent application Ser. No. 13/698,312 filed Jan. 11, 2013, which is a national stage application of PCT/JP2011/060990, and claims priority to JP2010/113691 and JP2010/118833.

TECHNICAL FIELD

The present invention relates to a mobile station, a radio base station, and a communication control method.

BACKGROUND ART

As a successor of a WCDMA (Wideband Code Division Multiplexing Access) system, an HSDPA (High-Speed Downlink Packet Access) system, and an HSUPA (High-Speed Uplink Packet Access) system, an LTE (Long Term Evolution) system has been considered and standardized by 3GPP (The 3rd Generation Partnership Project), which is a standardization organization of WCDMA.

Furthermore, as a successor of the LTE system, an LTE-advanced system is under consideration by 3GPP. The requirements for the LTE-advanced system are summarized in TS 36.913 (V8.0.1).

As one of the requirements in the LTE-advanced system, an agreement is reached that carrier aggregation is applied. When carrier aggregation is applied, a mobile station UE can receive downlink signals simultaneously using plural carriers or transmit uplink signals simultaneously using plural carriers. Each carrier used in carrier aggregation is referred to as a "component carrier".

The plural component carriers are categorized into a primary component carrier as a main carrier and one or more secondary component carriers other than the primary component carrier.

When a mobile station UE performs communications always using the primary component carrier and the secondary component carriers, a problem arises that power consumption becomes higher in proportion to the number of component carriers. As used herein, communicating using the primary component carrier and the secondary component carriers includes usual data transmission and reception, cell search or measurement on the respective carriers, and radio link monitoring.

For example, the cell search includes establishing synchronization in downlink using downlink synchronization signals in a serving cell and an adjacent cell. Since cell search is the processing for detecting a destination cell (target cell) while a mobile station UE is moving, the mobile station UE periodically needs to perform cell search. For example, the measurement includes measuring received power (more specifically, RSRP (Reference Signal Received Power) or the like) of reference signals in a serving cell and an adjacent cell. It should be noted that the combined processing of cell search and measurement may be referred to as "measurement". The radio link monitoring includes measuring radio quality (more specifically, SIR (Signal-to-Interference Ratio)) of reference signals in a serving cell, determining whether the SIR is above a predetermined threshold, and determining that the serving cell is in out-of-synchronization when the SIR is below the predetermined threshold. The processing associated with cell search, measurement, and radio link monitoring and their performance definitions are described in 3GPP TS 36.213 V8.8.0 (2009-09) and 3GPP TS 36.133 V8.7.0 (2009-09), for example.

In order to address the problem of power consumption, it is considered that control of activation/de-activation is applied in a secondary component carrier, for example. For example, on a secondary component carrier in a de-activation state, a mobile station UE does not perform usual data transmission and reception and reduces the frequencies of cell search, measurement, and radio link monitoring, thereby saving the battery. The processing of de-activation on a secondary component carrier is performed when the amount of data to be communicated is small, for example.

In the LTE system, discontinuous reception (DRX) control is applied in order to save the battery in a mobile station UE (see 3GPP TS 36.321 V8.7.0 (2009-09)). Discontinuous reception control in the LTE system is applied when a radio base station eNB and a mobile station UE are in a connected state and there are no data to be transmitted. A mobile station UE in a discontinuous reception state is configured to periodically, that is, intermittently, receive downlink control signals transmitted via a PDCCH (Physical Downlink Control Channel). The duration in which the downlink control signals are received via the PDCCH is referred to as an "on-duration" (ON interval or reception interval). Typically, cell search, measurement, and radio link monitoring are performed in the on-duration. Since a mobile station UE need only receive downlink signals transmitted via the PDCCH intermittently, rather than at all timings, and thus needs only to intermittently perform cell search, measurement, and radio link monitoring, power consumption of the battery can be reduced.

More specifically, as shown in FIG. 1, a mobile station UE is configured to perform reception of the PDCCH, cell search, measurement, radio link monitoring, and so on only during a reception interval (5 ms in the example of FIG. 1) provided for each DRX period (1280 ms in the example of FIG. 1) and turn off the transceiver during the other interval. As a result, the mobile station UE can reduce power consumption of the battery.

In addition, in the LTE system, a measurement gap is defined in order to perform measurement on a carrier with a different frequency or a carrier for a different radio communication system (see 3GPP TS 36.331 V8.8.0 (2009-12)). The length of the measurement gap is defined as 6 ms and its periodicity is defined as 40 ms or 80 ms, for example. During the measurement gap, a mobile station UE suspends communications in a serving cell and performs measurement on a carrier with a different frequency or a carrier for a different radio communication system.

DISCLOSURE OF INVENTION

Problem(s) to be Solved by the Invention

As described above, when carrier aggregation is applied, it is considered that de-activation is applied in a secondary component carrier.

In this case, a mobile station UE performs communications only on a primary component carrier in an ordinary state. Only when the mobile station UE performs cell search, measurement, and radio link monitoring, the mobile station UE performs communications on both the primary component carrier and the secondary component carrier.

However, as shown in FIGS. 2 and 3, the mobile station UE needs to change the center frequency of the receiver between the case where the mobile station UE performs communications only on the primary component carrier and the case where the mobile station UE performs communications on both the primary component carrier and the secondary component carrier, for example. As a result, at the time of the change between the case where the mobile station UE performs communications only on the primary component carrier and the case where the mobile station UE performs communications on both the primary component carrier and the secondary component carrier, a problem arises that the mobile station UE cannot transmit and receive data on the primary component carrier. For example, the state in which the mobile station UE cannot transmit and receive data may include a state in which data to be transmitted and received are lost.

In other words, when the mobile station UE receives plural component carriers using a single receiver, the change of the center frequency of the receiver occurs when the number of component carriers to be received varies, for example. As a result, the mobile station UE cannot transmit and receive data at the time of the change.

Since the time when the mobile station UE performs cell search, measurement, and radio link monitoring typically depends on the implementation of the mobile station UE, the radio base station eNB cannot recognize when data are lost.

In view of the problem as described above, it is a general object of the present invention to provide a mobile station, a radio base station, and a communication control method for making a system more efficient and achieving stability of connections, by saving a battery when carrier aggregation is applied while appropriately performing cell search, measurement, or the like on each component carrier.

Means for Solving the Problem(s)

In one aspect of the present invention, there is provided a mobile station for communicating with a radio base station using two or more carriers, including:

where the two or more carriers include a carrier in a non-discontinuous reception state and a carrier in a discontinuous reception state, a first communicating unit configured to perform communications on the carrier in the non-discontinuous reception state; and a second communicating unit configured to perform communications on the carrier in the discontinuous reception state; wherein the first communicating unit treats intervals before and after an on-duration on the carrier in the discontinuous reception state as measurement gaps.

In another aspect of the present invention, there is provided a communication control method in a mobile station for communicating with a radio base station using two or more carriers, including:

where the two or more carriers include a carrier in a non-discontinuous reception state and a carrier in a discontinuous reception state, a first step of performing communications on the carrier in the non-discontinuous reception state; and a second step of performing communications on the carrier in the discontinuous reception state; wherein the first step comprises treating intervals before and after an on-duration on the carrier in the discontinuous reception state as measurement gaps.

In another aspect of the present invention, there is provided a radio base station for communicating with a mobile station using two or more carriers, including:

where the two or more carriers include a carrier in a non-discontinuous reception state and a carrier in a discontinuous reception state, a first communicating unit configured to perform communications on the carrier in the non-discontinuous reception state; and a second communicating unit configured to perform communications on the carrier in the discontinuous reception state; wherein the first communicating unit treats intervals before and after an on-duration on the carrier in the discontinuous reception state as measurement gaps.

In another aspect of the present invention, there is provided a communication control method in a radio base station for communicating with a mobile station using two or more carriers, including:

where the two or more carriers include a carrier in a non-discontinuous reception state and a carrier in a discontinuous reception state, a first step of performing communications on the carrier in the non-discontinuous reception state; and a second step of performing communications on the carrier in the discontinuous reception state; wherein the first step comprises treating intervals before and after an on-duration on the carrier in the discontinuous reception state as measurement gaps.

In another aspect of the present invention, there is provided a mobile station for communicating with a radio base station using two or more carriers, comprising:

where the two or more carriers include a carrier in a non-discontinuous reception state and a carrier in a discontinuous reception state, a first communicating unit configured to perform communications on the carrier in the non-discontinuous reception state; and a second communicating unit configured to perform communications on the carrier in the discontinuous reception state; wherein the second communicating unit treats intervals before and after an on-duration on the carrier in the discontinuous reception state as measurement gaps and performs measurement on the carrier in the discontinuous reception state during the interval before the on-duration on the carrier in the discontinuous reception state.

Advantageous Effect of the Invention

According to the present invention, it is possible to provide a mobile station, a radio base station, and a communication control method for making a system more efficient and achieving stability of connections, by saving a battery when carrier aggregation is applied while appropriately performing cell search, measurement, or the like on each component carrier.

BRIEF DESCRIPTION OF THE DRAWINGS

FIG. 13 shows a diagram illustrating an SCC measurement interval used in a modified embodiment of the present invention.

DETAILED DESCRIPTION OF THE PREFERRED EMBODIMENTS

Figure 1:
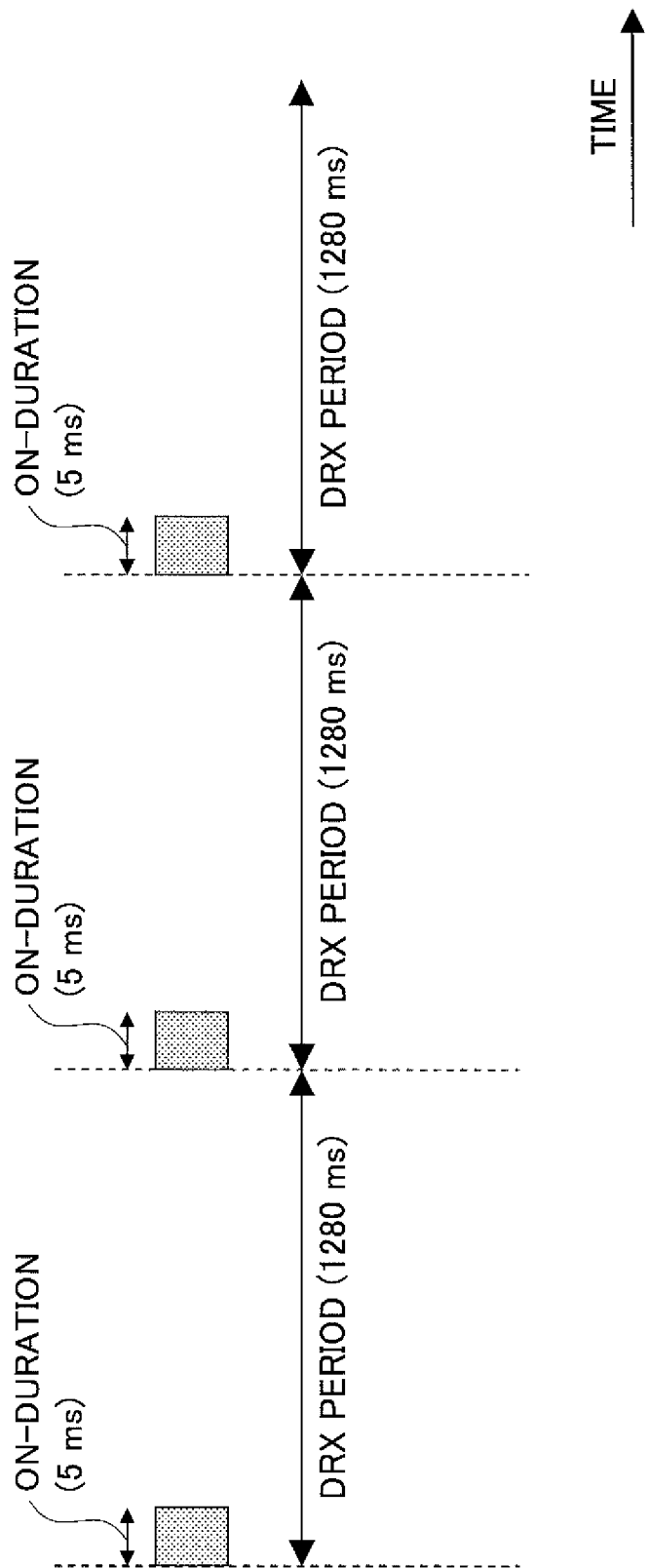
FIG. 1 shows a diagram for illustrating discontinuous reception control in a conventional mobile communication system.

Configuration of a Mobile Communication System in Accordance with an Embodiment of the Present Invention A mobile communication system in accordance with an embodiment of the present invention is described below with reference to the accompanying drawings. Throughout the figures for illustrating the embodiments of the present invention, the same reference numerals are used for the same or equivalent elements and their repeated descriptions may be omitted.

For example, the mobile communication system in accordance with this embodiment is an LTE-advanced system. In other words, the mobile communication system in accordance with this embodiment includes a radio base station eNB and a mobile station UE for communicating with the radio base station eNB, and the radio base station eNB and the mobile station UE perform communications according to the LTE-Advanced scheme. The mobile station UE may be also referred to as a "user equipment" terminal.

Communication channels used in the mobile communication system in accordance with this embodiment are described below.

In the mobile communication system in accordance with this embodiment, a PDSCH (Physical Downlink Shared Channel) shared by mobile stations UE and a PDCCH (Physical Downlink Control Channel) are used in downlink.

User data (i.e. typical data signals) are transmitted via the PDSCH.

Control signals such as an ID of a mobile station UE for performing communications using the PDSCH and transport format information of user data (i.e. downlink scheduling information) as well as an ID of a mobile station UE for performing communications using a PUSCH (Physical Uplink Shared Channel) and transport format information of user data (i.e. uplink scheduling grant) are transmitted via the PDCCH.

The PDCCH may be also referred to as a "Downlink L1/L2 Control Channel". The downlink scheduling information and the uplink scheduling grant are collectively referred to as "downlink control information (DCI)".

In downlink, broadcast information is mapped to a BCCH (Broadcast Control Channel) as a logical channel and transmitted.

Part of information to be transmitted via the BCCH is mapped to a BCH (Broadcast Channel) as a transport channel. Information mapped to the BCH is transmitted to mobile stations UE within the corresponding cell via a P-BCH (Physical Broadcast Channel) as a physical channel.

Part of information to be transmitted via the BCCH is also mapped to a DL-SCH (Downlink Shared Channel) as a transport channel. Information mapped to the DL-SCH is transmitted to mobile stations UE within the corresponding cell via the PDSCH as a physical channel.

In the mobile communication system in accordance with this embodiment, a PUSCH (Physical Uplink Shared Channel) shared by mobile stations UE and a PUCCH (Physical Uplink Control Channel) are used in uplink.

User data (i.e. typical data signals) are transmitted via the PUSCH.

Downlink quality information (CQI: Channel Quality Indicator) used for scheduling processing and AMCS (Adaptive Modulation and Coding Scheme) of the PDSCH and acknowledgement information for the PUSCH are transmitted via the PUCCH.

The downlink quality information may be also referred to as a "CSI (Channel State Indicator)", which is an indicator collectively representing a CQI, a PMI (Pre-coding Matrix Indicator), and a RI (Rank Indicator).

The acknowledgement information is expressed as either ACK (Acknowledgement) indicating that a transmission signal is successfully received or NACK (Negative Acknowledgement) indicating that a transmission signal is not successfully received.

When carrier aggregation as described below is applied, operations in the communication channels used in the mobile communicate system in accordance with this embodiment may be performed on a single component carrier or across plural component carriers. For example, downlink scheduling information may be transmitted on one component carrier and the PDSCH corresponding to this downlink scheduling information may be transmitted on another component carrier. Alternatively, an uplink scheduling grant may be transmitted on one component carrier and the PUSCH corresponding to this uplink scheduling grant may be transmitted on another component carrier.

In the LTE-Advanced system, carrier aggregation may be applied. In other words, communications in uplink or downlink are performed using plural component carriers.

A component carrier corresponds to a single system carrier in an LTE system. In the LTE system, communications are performed on a single component carrier. In the LTE-Advanced system, on the other hand, communications may be performed on two or more component carriers.

Figure 4:
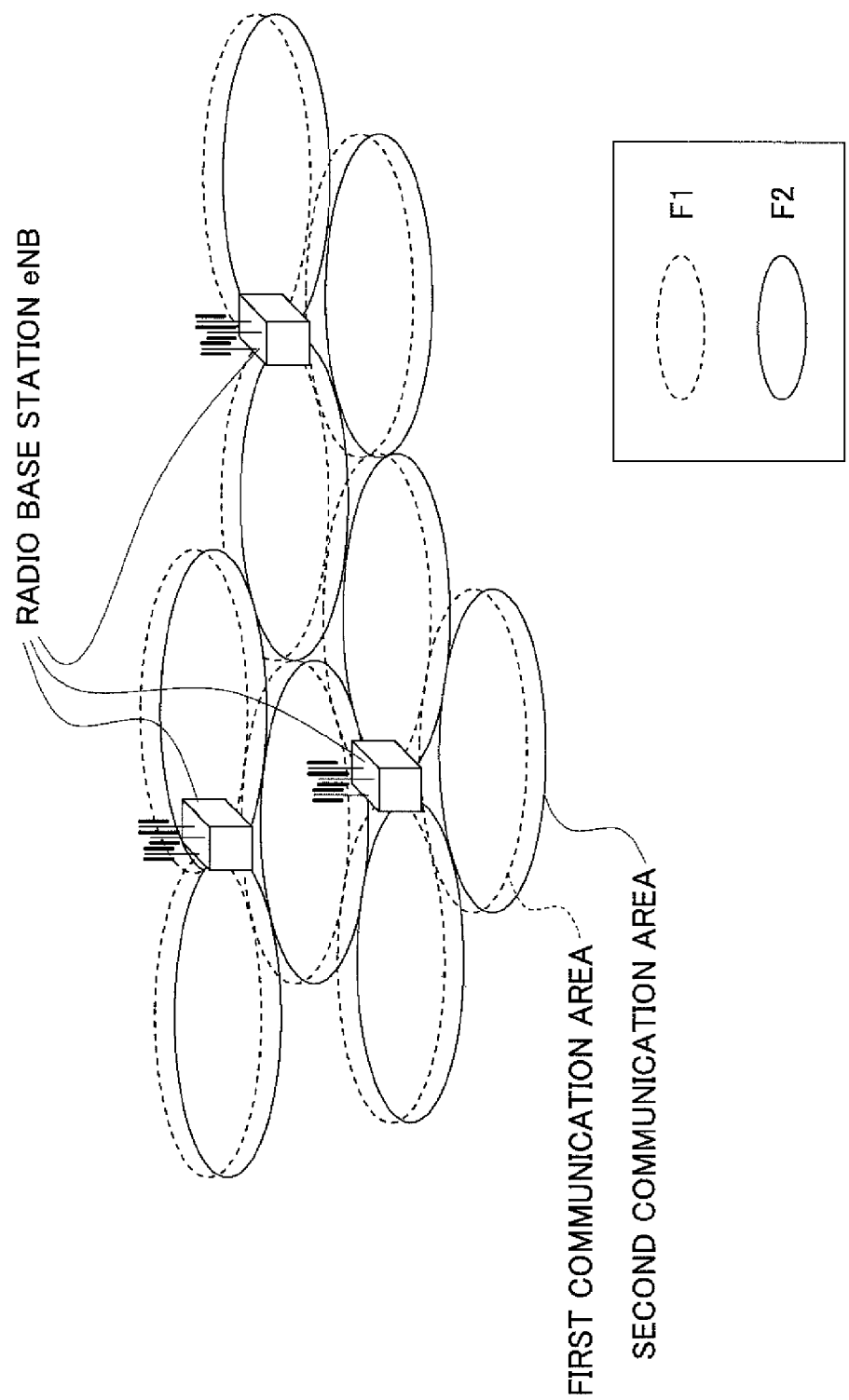
FIG. 4 shows a diagram for illustrating component carriers in a mobile communication system in accordance with an embodiment of the present invention.

For example, as shown in FIG. 4, a cell (first communication area) in which a first component carrier (F1 in FIG. 4) is used geographically overlaps with a cell (second communication area) in which a second component carrier (F2 in FIG. 4) is used in the mobile communication system in accordance with this embodiment. Although FIG. 4 shows that the first communication area almost coincides with the second communication area, the first communication area may at least partially overlap with the second communication area.

Although not shown in FIG. 4, a third component carrier may be used in addition to the first component carrier and the second component carrier. Alternatively, four or more component carriers may be used.

In the following description, it is assumed that carrier aggregation is applied using a first component carrier (hereinafter referred to as a "first carrier") and a second component carrier (hereinafter referred to as a "second carrier").

Regarding the first carrier and the second carrier, it is also assumed that discontinuous reception control is applied in each component carrier, the first carrier is in a non-discontinuous reception state (Non-DRX state), and the second carrier is in a discontinuous state (DRX state). In other words, on the first carrier, usual data transmission and reception are performed, and cell search, measurement, and radio link monitoring are performed without reducing their frequencies. On the second carrier, on the other hand, usual data transmission and reception are not basically performed, and the frequencies of cell search, measurement, and radio link monitoring are reduced. It should be noted that radio link monitoring may not be performed. Since a mobile station UE can reduce workload for processing on the second carrier (i.e. workload for cell search, measurement, and radio link monitoring), the mobile station UE can save the battery.

The first carrier may be a primary component carrier and the second carrier may be a secondary component carrier.

The Non-DRX state as described above may be a state in which a parameter associated with discontinuous reception control is not configured, a state in which a parameter associated with discontinuous reception control is configured and a timer for discontinuous reception control is in an operating state, a state in which a parameter associated with discontinuous reception control is configured and a scheduling request is in a pending state, a state in which a parameter associated with discontinuous reception control is configured and a timing for uplink HARQ (Hybrid Automatic Repeat Request) retransmission is provided, or a state in which a parameter associated with discontinuous reception control is configured and a downlink control signal for initial transmission destined for the own station is not received after a random access response for a specified preamble is received. In addition, the DRX state may be a state other than the Non-DRX state.

The DRX state may be a state in which data transmission and reception are intermittently performed or a state in which data transmission and reception and measurement on the carrier are intermittently performed. More generally, the DRX state may be a state in which measurement on the carrier is intermittently performed.

Figure 5:
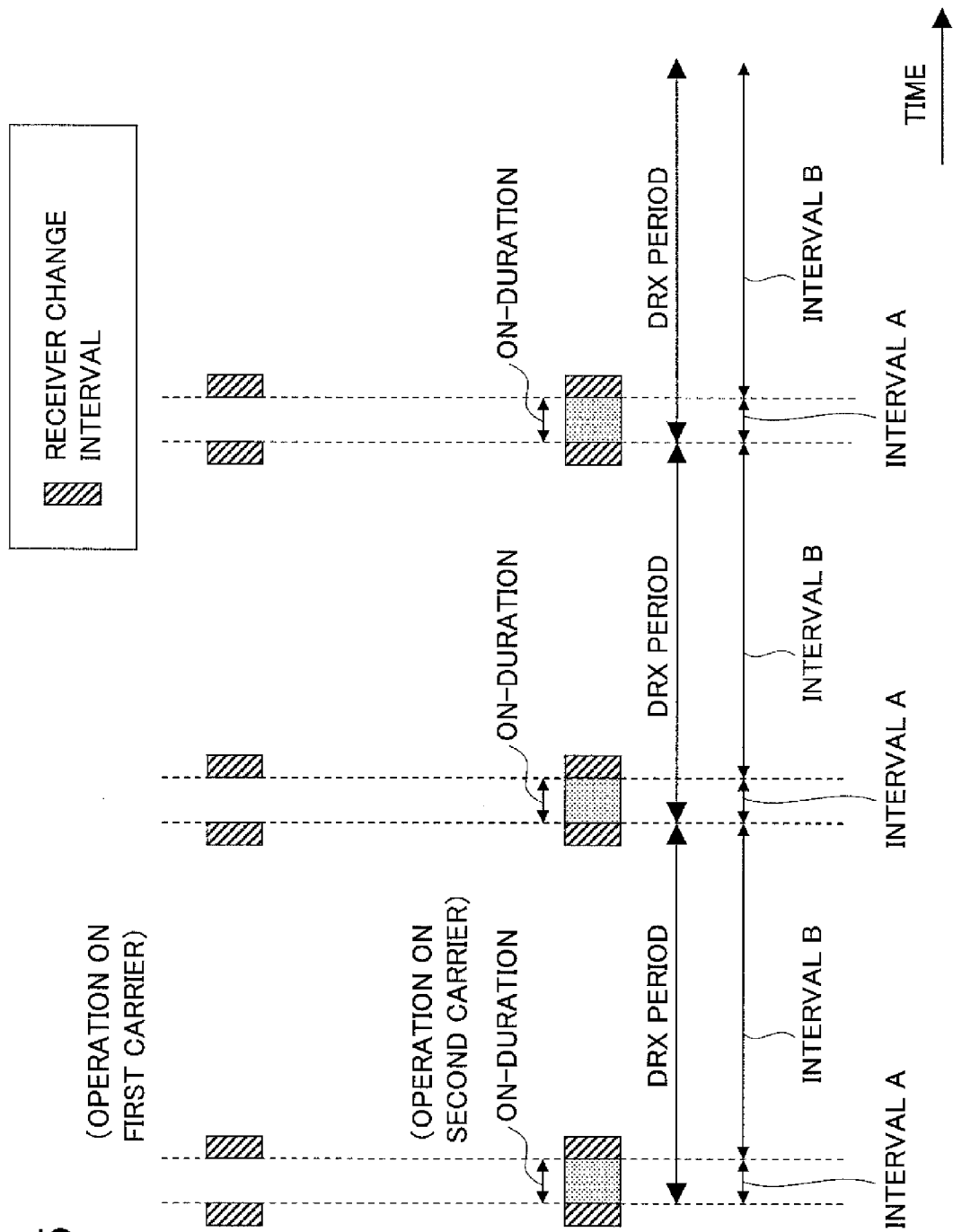
FIG. 5 shows a diagram for illustrating operations in a mobile station and a radio base station in accordance with an embodiment of the present invention (where receiver change intervals are the same).

With reference to FIG. 5, operations in a mobile station and a radio base station in accordance with an embodiment of the present invention are described below. More specifically, when a component carrier (first carrier) in a non-discontinuous state and a component carrier (second carrier) in a discontinuous state are used, operations on the component carrier (first carrier) in the non-discontinuous state and the component carrier (second carrier) in the discontinuous state are described considering an on-duration (ON interval) on the component carrier (second carrier) in the discontinuous state.

In FIG. 5, on the second carrier, an on-duration (ON interval) is provided for each DRX period. In this example, the on-duration is referred to as an interval A and the duration in the DRX period other than the on-duration is referred to as an interval B. For example, the DRX period may be defined as 256 ms, 512 ms, or 1280 ms. For example, the DRX period may be defined as any value other than these values. The DRX period can be used to control the extent to which a mobile station UE saves the battery.

On the second carrier, the mobile station UE is configured to perform cell search, measurement, radio link monitoring, and so on and to receive downlink control signals transmitted via the PDCCH only during the interval A. In addition, on the second carrier, the mobile station UE is configured not to perform cell search, measurement, and radio link monitoring and not to receive downlink control signals during the interval B. Since the mobile station UE performs processing on the second carrier only during the interval A, the battery can be saved. It should be noted that the downlink control signals include downlink scheduling information and an uplink scheduling grant as described above, for example.

On the first carrier, on the other hand, the mobile station UE performs usual data transmission and reception, cell search, and radio link monitoring regardless of during the interval A or B, because the first carrier is the component carrier in the non-discontinuous reception state.

Figure 2:
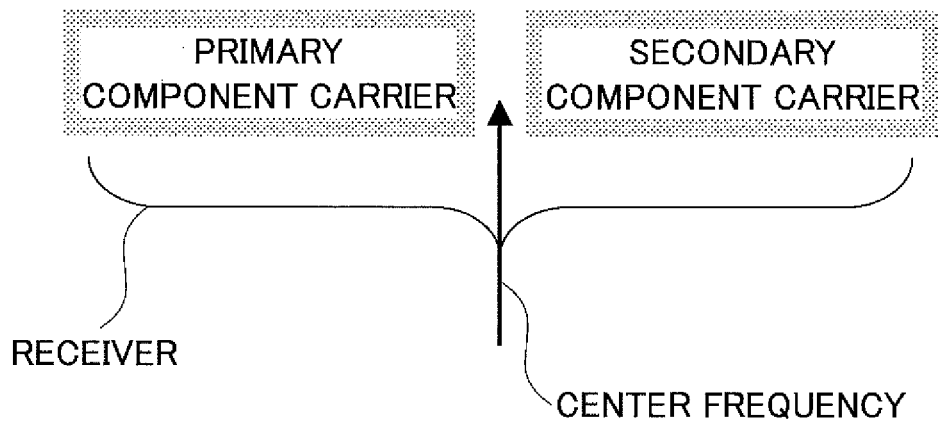
FIG. 2 shows a diagram for illustrating the center frequency of a receiver when both a primary component carrier and a secondary component carrier are received.

Regarding operations in the radio base station eNB and the mobile station UE in accordance with this embodiment, receiver change intervals are provided before and after the on-duration for discontinuous reception control on the second carrier, in order to avoid data loss in connection with the change of the center frequency of the receiver, for example, as described with reference to FIG. 2.

In other words, the mobile station UE and the radio base station eNB may perform communication processing on the first carrier, assuming that data transmission and reception on the first carrier are not allowed during predetermined intervals provided before and after the on-duration for discontinuous reception control on the second carrier, because the receiver in the mobile station UE changes the center frequency, for example. The predetermined intervals (i.e. receiver change intervals) provided before and after the on-duration for discontinuous reception control on the second carrier are hereinafter referred to as "gap intervals" for the on-duration. It should be noted that the communication processing on the first carrier may include measurement, cell search, radio link monitoring, or the like on the first carrier, in addition to data transmission and reception on the first carrier, for example. The data transmission and reception on the first carrier may be downlink data reception and uplink data transmission from the viewpoint of the mobile terminal UE, or downlink data transmission and uplink data reception from the viewpoint of the radio base station eNB. The combined processing of measurement and cell search may be referred to as "measurement".

For example, the mobile station UE may be configured not to perform downlink reception, uplink transmission, cell search, measurement, and radio link monitoring on the first carrier during the receiver change intervals. The radio base station eNB may be configured not to perform downlink transmission and uplink reception for the mobile station UE on the first carrier during the receiver change intervals. In addition, the radio base station eNB may be configured to perform uplink and downlink scheduling on the first carrier such that downlink transmission and uplink reception on the first carrier are not performed during the receiver change intervals.

The mobile station UE and the radio base station eNB may be configured to perform communication processing on the first carrier, assuming that the receiver change intervals correspond to measurement gaps. For example, performing communication processing on the first carrier assuming that the receiver change intervals correspond to measurement gaps may include not performing data transmission and reception, cell search, measurement, radio link monitoring, or the like on the first carrier during the receiver change intervals, as described above. These measurement gaps may be time intervals provided for measuring a carrier with a different frequency or a carrier for a different radio communication system.

In addition, the mobile station UE and the radio base station eNB may perform communication processing on the second carrier assuming that data transmission and reception on the second carrier are not allowed during the predetermined intervals (i.e. the gap intervals for the on-duration) provided before and after the on-duration for discontinuous reception control on the second carrier, because the receiver in the mobile station UE changes the center frequency, for example. It should be noted that the communication processing on the second carrier may include data transmission and reception or the like on the second carrier, for example. The data transmission and reception on the second carrier may be downlink data reception and uplink data transmission from the viewpoint of the mobile terminal UE, or downlink data transmission and uplink data reception from the viewpoint of the radio base station eNB.

For example, the mobile station UE may be configured not to perform downlink reception and uplink transmission on the second carrier during the receiver change intervals. The radio base station eNB may be configured not to perform downlink transmission and uplink reception for the mobile station UE on the second carrier during the receiver change intervals. In addition, the radio base station eNB may be configured to perform uplink and downlink scheduling on the second carrier such that downlink transmission and uplink reception on the second carrier are not performed during the receiver change intervals.

The mobile station UE and the radio base station eNB may be configured to perform communication processing on the second carrier, assuming that the receiver change intervals correspond to measurement gaps. For example, performing communication processing on the second carrier assuming that the receiver change intervals correspond to measurement gaps may include not performing data transmission and reception on the second carrier during the receiver change intervals, as described above. These measurement gaps may be time intervals provided for measuring a carrier with a different frequency or a carrier for a different radio communication system.

The predetermined intervals (i.e. receiver change intervals or gap duration for the on-duration) provided before and after the on-duration may be also referred to as "transceiver change intervals", considering that the change of the transmitter in addition to the change of the receiver may be made. Alternatively, these predetermined intervals provided before and after the on-duration may be also referred to as "measurement gaps" accompanied with the on-duration, because they are provided before and after the on-duration for discontinuous reception control. Alternatively, these predetermined intervals provided before and after the on-duration may be also referred to as "measurement gaps" synonymous with commonly-known measurement gaps.

For example, the predetermined intervals (i.e. gap intervals for the on-duration) provided before and after the on-duration may be defined as 1 ms or 2 ms. Alternatively, the gap periods for the on-duration may be defined as any value other than 1 ms and 2 ms.

Figure 6:
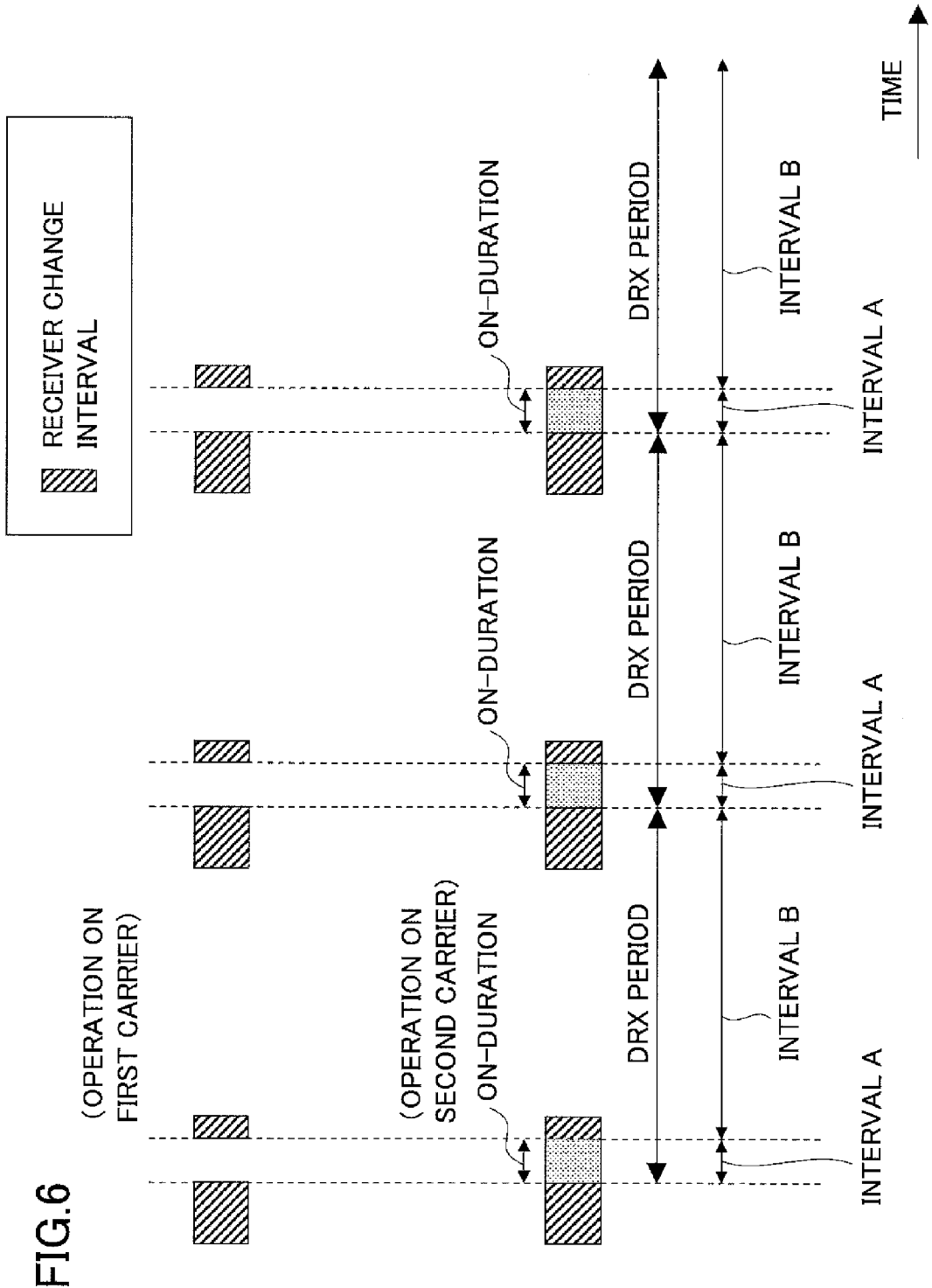
FIG. 6 shows a diagram for illustrating operations in a mobile station and a radio base station in accordance with an embodiment of the present invention (where receiver change intervals are different).

Regarding the predetermined intervals (i.e. gap intervals for the on-duration) provided before and after the on-duration, the interval provided before the on-duration may be longer than the interval provided after the on-duration, as shown in FIG. 6. An effect of defining the interval provided before the on-duration longer than the interval provided after the on-duration is described below.

For example, the predetermined interval provided before the on-duration and the predetermined interval provided after the on-duration may be specifically defined as 6 ms and 1 ms, respectively. Alternatively, the predetermined interval provided before the on-duration and the predetermined interval provided after the on-duration may be specifically defined as 4 ms and 2 ms, respectively, or defined as any values provided that the predetermined interval provided before the on-duration is longer than the predetermined interval provided after the on-duration.

The predetermined time intervals (i.e. gap intervals for the on-duration) provided before and after the on-duration may be applied only when the first carrier and the second carrier belong to the same frequency band and may not be applied when the first carrier and the second carrier belong to different frequency bands.

Figure 3:
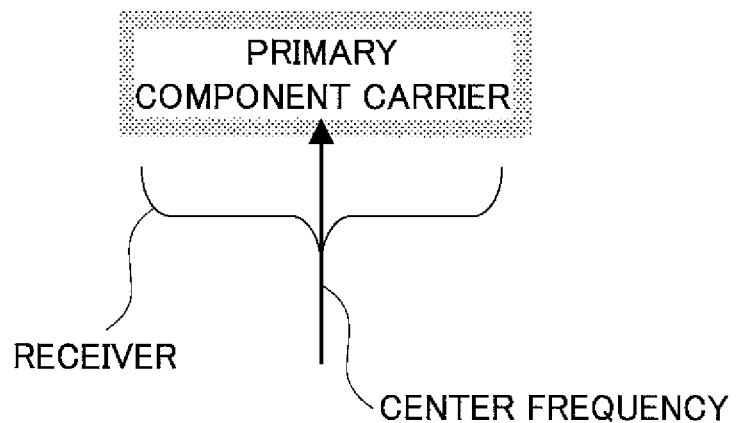
FIG. 3 shows a diagram for illustrating the center frequency of a receiver when only a primary component carrier is received.

When the first carrier and the second carrier belong to different frequency bands, the mobile station UE typically includes different receivers for the first carrier and the second carrier. Thus, the change of the center frequency as shown in FIGS. 2 and 3 does not occur, and as a result, data are not lost. Accordingly, when the first carrier and the second carrier belong to different frequency bands, the predetermined periods provided before and after the on-duration are not needed. In other words, only when the first carrier and the second carrier belong to the same frequency band, the gap intervals for the on-duration are provided, and when the first carrier and the second carrier belong to different frequency bands, the gap intervals for the on-duration are not provided. In this manner, the gap intervals for the on-duration can be provided only when needed, and accordingly the efficiency of the system can be improved.

It should be noted that the on-duration on the second carrier is provided only when the second carrier is in the DRX state and is not provided when the second carrier is in the Non-DRX state. When the second carrier is in the Non-DRX state, the center frequency of the receiver in the mobile station UE is always configured as shown in FIG. 2. Thus, the mobile station UE and the radio base station eNB can perform communications on the first carrier and the second carrier without considering the gap intervals for the on-duration. As a result, when both the first carrier and the second carrier are in the Non-DRX state, the mobile station UE and the radio base station eNB can perform communications on the first carrier and the second carrier without using gap intervals for measurement, and accordingly the loss of throughput can be avoided.

Figure 7:
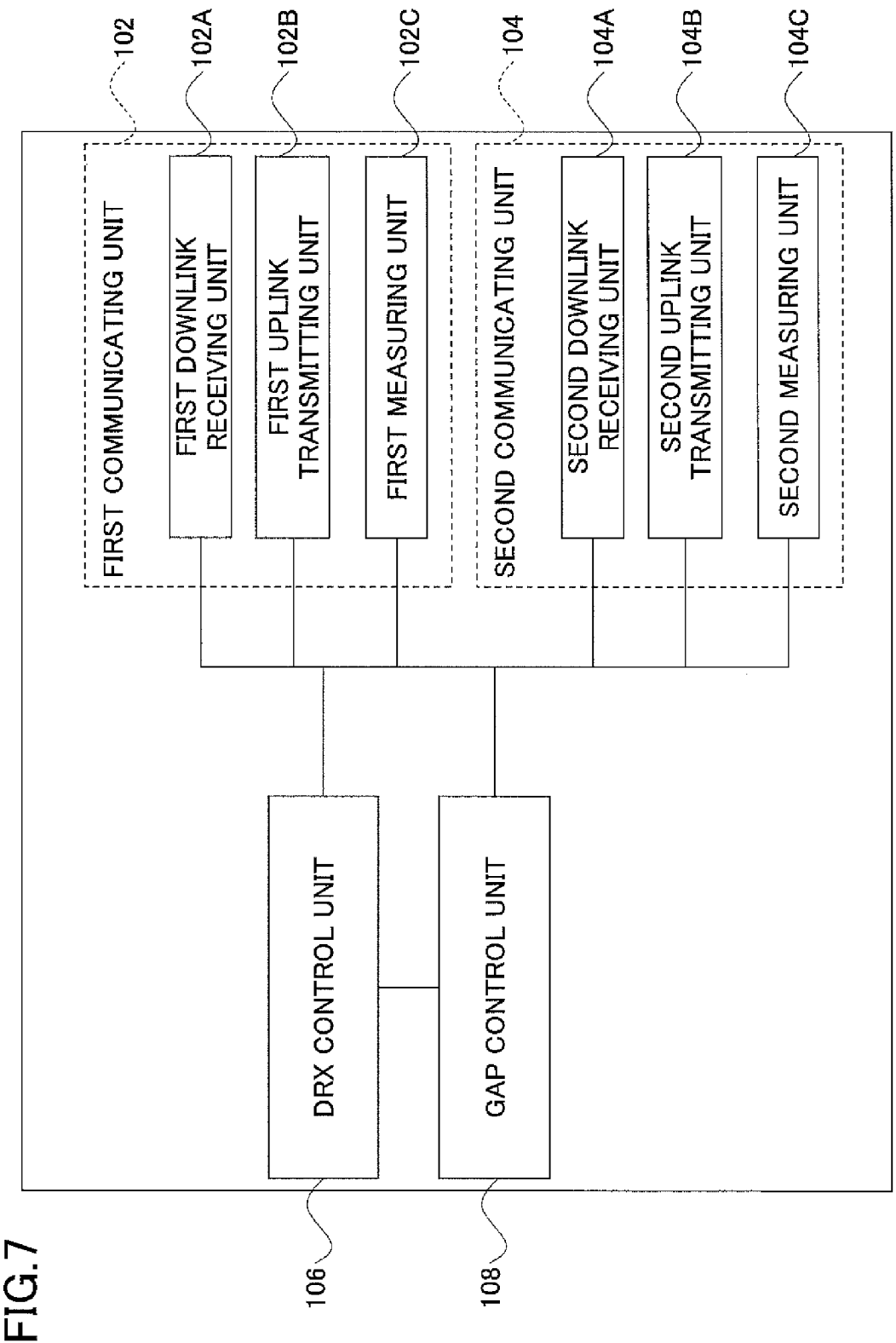
FIG. 7 shows a block diagram of a mobile station in accordance with an embodiment of the present invention.

As shown in FIG. 7, a mobile station UE includes a first communicating unit 102, a second communicating unit 104, a DRX control unit 106, and a gap unit 108. The first communicating unit 102 includes a first downlink receiving unit 102A, a first uplink transmitting unit 102B, and a first measuring unit 102C. The second communicating unit 104 includes a second downlink receiving unit 104A, a second uplink transmitting unit 104B, and a second measuring unit 104C.

It should be noted that FIG. 7 shows functional units associated with baseband processing in the mobile station UE, but does not show functional units associated with RF (radio frequency) processing in the mobile station UE. Since the receiver shown in FIG. 2 or 3 includes functional units associated with RF processing, these units are not shown in FIG. 7. The configuration of the mobile station UE in accordance with this embodiment can be used regardless of the functional units associated with RF processing.

The first communicating unit 102, the first downlink receiving unit 102A, the first uplink transmitting unit 102B, the first measuring unit 102C, the second communicating unit 104, the second downlink receiving unit 104A, the second uplink transmitting unit 104B, the second measuring unit 104C, the DRX control unit 106, and the gap control unit 108 are connected with each other.

The first communicating unit 102 performs communications related to a first carrier. For example, the first communicating unit 102 performs downlink reception and uplink transmission on the first carrier, and cell search, measurement, radio link monitoring, or the like on the first carrier.

As described above, the first communicating unit 102 may be configured not to perform communications related to the first carrier during predetermined intervals (i.e. gap intervals for the on-duration) provided before and after the on-duration for discontinuous reception control on a second carrier.

The first downlink receiving unit 102A receives downlink signals on the first carrier. For example, the downlink signals may be the PDSCH or the PDCCH. Alternatively, the downlink signals may be signals on a P-BCH as broadcast information, signals on a PSS (Primary Synchronization Signal) or an SSS (Secondary Synchronization Signal) as synchronization signals, or downlink reference signals.

As described above, the first downlink receiving unit 102A may be configured not to receive downlink signals on the first carrier during the predetermined intervals (i.e. gap intervals for the on-duration) provided before and after the on-duration for discontinuous reception control on the second carrier.

The first uplink transmitting unit 102B transmits uplink signals on the first carrier. For example, the uplink signals may be signals on the PUSCH or the PUCCH. Alternatively, the uplink signals may be sounding reference signals, demodulation reference signals, or signals on a random access channel.

As described above, the first uplink transmitting unit 102B may be configured not to transmit uplink signals on the first carrier during the predetermined intervals (i.e. gap intervals for the on-duration) provided before and after the on-duration for discontinuous reception control on the second carrier.

The first measuring unit 102C performs measurement processing such as cell search, measurement, or radio link monitoring on the first carrier.

As described above, the first measuring unit 102C may be configured not to perform measurement processing such as cell search, measurement, or radio link monitoring during the predetermined intervals (i.e. gap intervals for the on-duration) provided before and after the on-duration for discontinuous reception control on the second carrier.

The second communicating unit 104 performs communications related to the second carrier. For example, the second communicating unit 104 performs downlink reception and uplink transmission on the second carrier, and cell search, measurement, radio link monitoring, or the like on the second carrier.

As described above, the second communicating unit 104 may be configured not to perform communications related to the second carrier during the predetermined intervals (i.e. gap intervals for the on-duration) provided before and after the on-duration for discontinuous reception control on the second carrier.

The second downlink receiving unit 104A receives downlink signals on the second carrier. For example, the downlink signals may be the PDSCH or the PDCCH. Alternatively, the downlink signals may be signals on the P-BCH as broadcast information, signals on the PSS (Primary Synchronization Signal) or the SSS (Secondary Synchronization Signal) as synchronization signals, or downlink reference signals.

As described above, the second downlink receiving unit 104A may be configured not to receive downlink signals on the second carrier during the predetermined intervals (i.e. gap intervals for the on-duration) provided before and after the on-duration for discontinuous reception control on the second carrier.

The second uplink transmitting unit 104B transmits uplink signals on the second carrier. For example, the uplink signals may be signals on the PUSCH or the PUCCH. Alternatively, the uplink signals may be sounding reference signals, demodulation reference signals, or signals on the random access channel.

As described above, the second uplink transmitting unit 104B may be configured not to transmit uplink signals on the second carrier during the predetermined intervals (i.e. gap intervals for the on-duration) provided before and after the on-duration for discontinuous reception control on the second carrier.

The second measuring unit 104C performs measurement processing such as cell search, measurement, or radio link monitoring on the second carrier.

The second measuring unit 104C may perform measurement processing such as cell search, measurement, or radio link monitoring on the second carrier during the predetermined interval provided before the on-duration among the predetermined intervals (i.e. gap intervals for the on-duration) provided before and after the on-duration for discontinuous reception control on the second carrier. It should be noted that the measurement may include measurement of a path loss as described below.

The reason why the second measuring unit 104C performs measurement processing such as cell search, measurement, or radio link monitoring on the second carrier during the predetermined interval provided before the on-duration among the predetermined intervals (i.e. gap intervals for the on-duration) provided before and after the on-duration for discontinuous reception control on the second carrier is described below.

For example, it is assumed that data to be transmitted are generated when the second carrier is in a discontinuous reception state and uplink transmission occurs on the on-duration. In this case, it is preferable that transmission power for the uplink transmission be determined based on the latest possible path loss. When the path loss is measured in the on-duration, it is difficult to use the measurement result of the path loss to determine transmission power for the uplink transmission because of processing delay. On the other hand, when the path loss is measured during the interval provided before the on-duration, transmission power for the uplink transmission can be determined based on the latest path loss, and as a result, communication quality can be improved.

In this example, measuring the path loss during the interval provided before the on-duration means measuring downlink reference signal received power (RSRP) (so-called measurement) during the interval provided before the on-duration, because the path loss is estimated based on the downlink RSRP.

In addition to measurement of RSRP (so-called measurement), it is preferable that cell search and radio link monitoring be performed during the interval provided before the on-duration in order to perform the processing based on the measurement result in the subsequent on-duration.

During the interval provided after the on-duration, processing such as the change of the center frequency of the receiver is performed. On the other hand, during the interval provided before the on-duration, processing such as cell search, measurement, and radio link monitoring on the second carrier is performed as described above. Thus, the interval provided before the on-duration may be longer than the interval provided after the on-duration.

In this manner, the mobile station UE and the radio base station eNB may perform communication processing on the first carrier, assuming that data transmission and reception on the first carrier are not allowed during a first gap interval for the on-duration provided before the on-duration for discontinuous reception control on the second carrier and during a second gap interval for the on-duration provided after the on-duration for discontinuous reception control on the second carrier. The first gap interval for the on-duration may be longer than the second gap interval for the on-duration.

Communication control on the first carrier may be performed assuming that the first gap interval for the on-duration and the second gap interval for the on-duration are equivalent to measurement gaps. In other words, communications on the first carrier may be suspended assuming that the first gap interval for the on-duration and the second gap interval for the on-duration are equivalent to measurement gaps.

The DRX control unit 106 is configured to manage whether the mobile station UE is in a discontinuous reception state. More specifically, the DRX control unit 106 is configured to manage whether the mobile station UE is in a discontinuous state on each of the first carrier and the second carrier. The DRX control unit 106 provides whether the mobile station UE is in a discontinuous state (i.e. whether the mobile station UE is in a discontinuous state or in a non-discontinuous state) on each of the first carrier and the second carrier and its on-duration to the first communicating unit 102 (the first downlink receiving unit 102A, the first uplink transmitting unit 102B, and the first measuring unit 102C), the second communicating unit 104 (the second downlink receiving unit 104A, the second uplink transmitting unit 104B, and the second measuring unit 104C), and the gap control unit 108.

The gap control unit 108 controls a measurement gap. More specifically, the gap control unit 108 manages a measurement gap for measuring a carrier with a different frequency or a carrier for a different radio communication system. The gap control unit 108 provides information about a sub-carrier in which the measurement gap is provided to the DRX control unit 106, the first communicating unit 102 (the first downlink receiving unit 102A, the first uplink transmitting unit 102B, and the first measuring unit 102C), and the second communicating unit 104 (the second downlink receiving unit 104A, the second uplink transmitting unit 104B, and the second measuring unit 104C).

In addition to the control of the measurement gap, the gap control unit 108 also manages and controls receiver change intervals (i.e. gap intervals for the on-duration) as described above. More specifically, the gap control unit 108 determines intervals (i.e. gap intervals for the on-duration) provided before and after the on-duration for discontinuous reception control on the second carrier and provides the gap intervals for the on-duration to the DRX control unit 106, the first communicating unit 102 (the first downlink receiving unit 102A, the first uplink transmitting unit 102B, and the first measuring unit 102C), and the second communicating unit 104 (the second downlink receiving unit 104A, the second uplink transmitting unit 104B, and the second measuring unit 104C).

Figure 8:
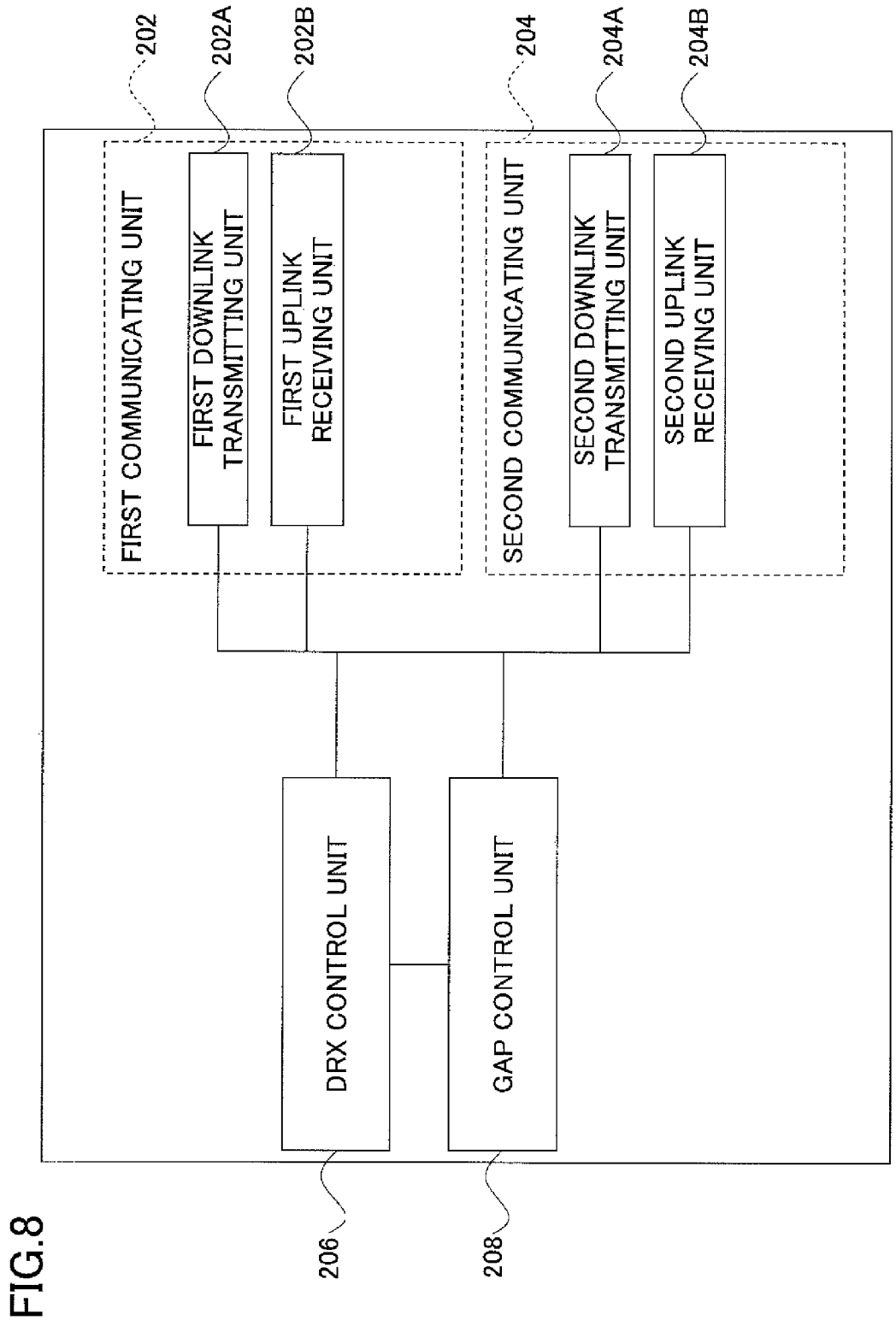
FIG. 8 shows a block diagram of a radio base station in accordance with an embodiment of the present invention.

As shown in FIG. 8, a radio base station eNB includes a first communicating unit 202, a second communicating unit 204, a DRX control unit 206, and a gap unit 208. The first communicating unit 202 includes a first downlink transmitting unit 202A and a first uplink receiving unit 202B. The second communicating unit 204 includes a second downlink transmitting unit 204A and a second uplink receiving unit 204B. The first communicating unit 202, the first downlink transmitting unit 202A, the first uplink receiving unit 202B, the second communicating unit 204, the second downlink transmitting unit 204A, the second uplink receiving unit 204B, the DRX control unit 206, and the gap control unit 208 are connected with each other.

The first communicating unit 202 performs communications related to a first carrier. For example, the first communicating unit 202 performs downlink transmission and uplink reception on the first carrier.

As described above, the first communicating unit 202 may be configured not to perform communications related to the first carrier during predetermined intervals (i.e. gap intervals for the on-duration) provided before and after the on-duration for discontinuous reception control on a second carrier.

The first downlink transmitting unit 202A transmits uplink signals on the first carrier. For example, the downlink signals may be the PDSCH or the PDCCH. Alternatively, the downlink signals may be signals on the P-BCH as broadcast information, signals on the PSS (Primary Synchronization Signal) or the SSS (Secondary Synchronization Signal) as synchronization signals, or downlink reference signals.

As described above, the first downlink transmitting unit 202A may be configured not to transmit downlink signals on the first carrier during the predetermined intervals (i.e. gap intervals for the on-duration) provided before and after the on-duration for discontinuous reception control on the second carrier.

Alternatively, the first downlink transmitting unit 202A may perform scheduling such that a mobile station UE does not receive downlink signals during the gap intervals for the on-duration. The scheduling includes processing for selecting a mobile station UE which communicates using the shared channel in a certain sub-frame.

The first uplink receiving unit 202B receives uplink signals on the first carrier. For example, the uplink signals may be signals on the PUSCH or the PUCCH. Alternatively, the uplink signals may be sounding reference signals, demodulation reference signals, or signals on a random access channel.

As described above, the first uplink receiving unit 202B may be configured not to receive uplink signals on the first carrier during the predetermined intervals (i.e. gap intervals for the on-duration) provided before and after the on-duration for discontinuous reception control on the second carrier.

Alternatively, the first uplink receiving unit 202B may perform scheduling such that a mobile station UE does not transmit uplink signals during the gap intervals for the on-duration. The scheduling includes processing for selecting a mobile station UE which communicates using the shared channel in a certain sub-frame. More specifically, the first uplink receiving unit 202B may be configured not to transmit a scheduling grant to a mobile station UE in the corresponding sub-frame in downlink such that the mobile station UE does not transmit uplink signals during the gap intervals for the on-duration. The uplink scheduling grant may be transmitted via the first downlink transmitting unit 202A.

The second communicating unit 204 performs communications related to the second carrier. For example, the second communicating unit 204 performs downlink transmission, uplink reception, or the like on the second carrier.

As described above, the second communicating unit 204 may be configured not to perform communications related to the second carrier during the predetermined intervals (i.e. gap intervals for the on-duration) provided before and after the on-duration for discontinuous reception control on the second carrier.

The second downlink transmitting unit 204A transmits downlink signals on the second carrier. For example, the downlink signals may be the PDSCH or the PDCCH. Alternatively, the downlink signals may be signals on the P-BCH as broadcast information, signals on the PSS (Primary Synchronization Signal) or the SSS (Secondary Synchronization Signal) as synchronization signals, or downlink reference signals.

As described above, the second downlink transmitting unit 204A may be configured not to transmit downlink signals on the second carrier during the predetermined intervals (i.e. gap intervals for the on-duration) provided before and after the on-duration for discontinuous reception control on the second carrier.

Alternatively, the second downlink transmitting unit 204A may perform scheduling such that a mobile station UE does not receive downlink signals during the gap intervals for the on-duration. The scheduling includes processing for selecting a mobile station UE which communicates using the shared channel in a certain sub-frame.

The second uplink receiving unit 204B receives uplink signals on the second carrier. For example, the uplink signals may be signals on the PUSCH or the PUCCH. Alternatively, the uplink signals may be sounding reference signals, demodulation reference signals, or signals on the random access channel.

As described above, the second uplink receiving unit 204B may be configured not to receive uplink signals on the second carrier during the predetermined intervals (i.e. gap intervals for the on-duration) provided before and after the on-duration for discontinuous reception control on the second carrier.

Alternatively, the second uplink receiving unit 204B may perform scheduling such that a mobile station UE does not transmit uplink signals during the gap intervals for the on-duration. The scheduling includes processing for selecting a mobile station UE which communicates using the shared channel in a certain sub-frame. More specifically, the second uplink receiving unit 204B may be configured not to transmit a scheduling grant to a mobile station UE in the corresponding sub-frame in downlink such that the mobile station UE does not transmit uplink signals during the gap intervals for the on-duration. The uplink scheduling grant may be transmitted via the second downlink transmitting unit 204A.

The DRX control unit 206 is configured to manage and control whether each mobile station UE within the cell is in a discontinuous reception state. More specifically, the DRX control unit 206 is configured to manage and control whether each mobile station UE within the cell is in a discontinuous state on each of the first carrier and the second carrier. The DRX control unit 206 provides whether each mobile station UE within the cell is in a discontinuous state (i.e. whether each mobile station UE within the cell is in a discontinuous state or in a non-discontinuous state) on each of the first carrier and the second carrier and its on-duration to the first communicating unit 202 (the first downlink transmitting unit 202A and the first uplink receiving unit 202B), the second communicating unit 204 (the second downlink transmitting unit 204A and the second uplink receiving unit 204B), and the gap control unit 208.

The gap control unit 208 controls a measurement gap. More specifically, the gap control unit 208 manages a measurement gap for measuring a carrier with a different frequency or a carrier for a different radio communication system. The gap control unit 208 provides information about a sub-carrier in which the measurement gap is provided to the DRX control unit 206, the first communicating unit 202 (the first downlink transmitting unit 202A and the first uplink receiving unit 202B), and the second communicating unit 204 (the second downlink transmitting unit 204A and the second uplink receiving unit 204B).

In addition to the control of the measurement gap, the gap control unit 208 also manages and controls receiver change intervals (i.e. gap intervals for the on-duration) as described above. More specifically, the gap control unit 208 determines intervals (i.e. gap intervals for the on-duration) provided before and after the on-duration for discontinuous reception control on the second carrier and provides the gap intervals for the on-duration to the DRX control unit 206, the first communicating unit 202 (the first downlink transmitting unit 202A and the first uplink receiving unit 202B), and the second communicating unit 204 (the second downlink transmitting unit 204A and the second uplink receiving unit 204B).

Figure 9:
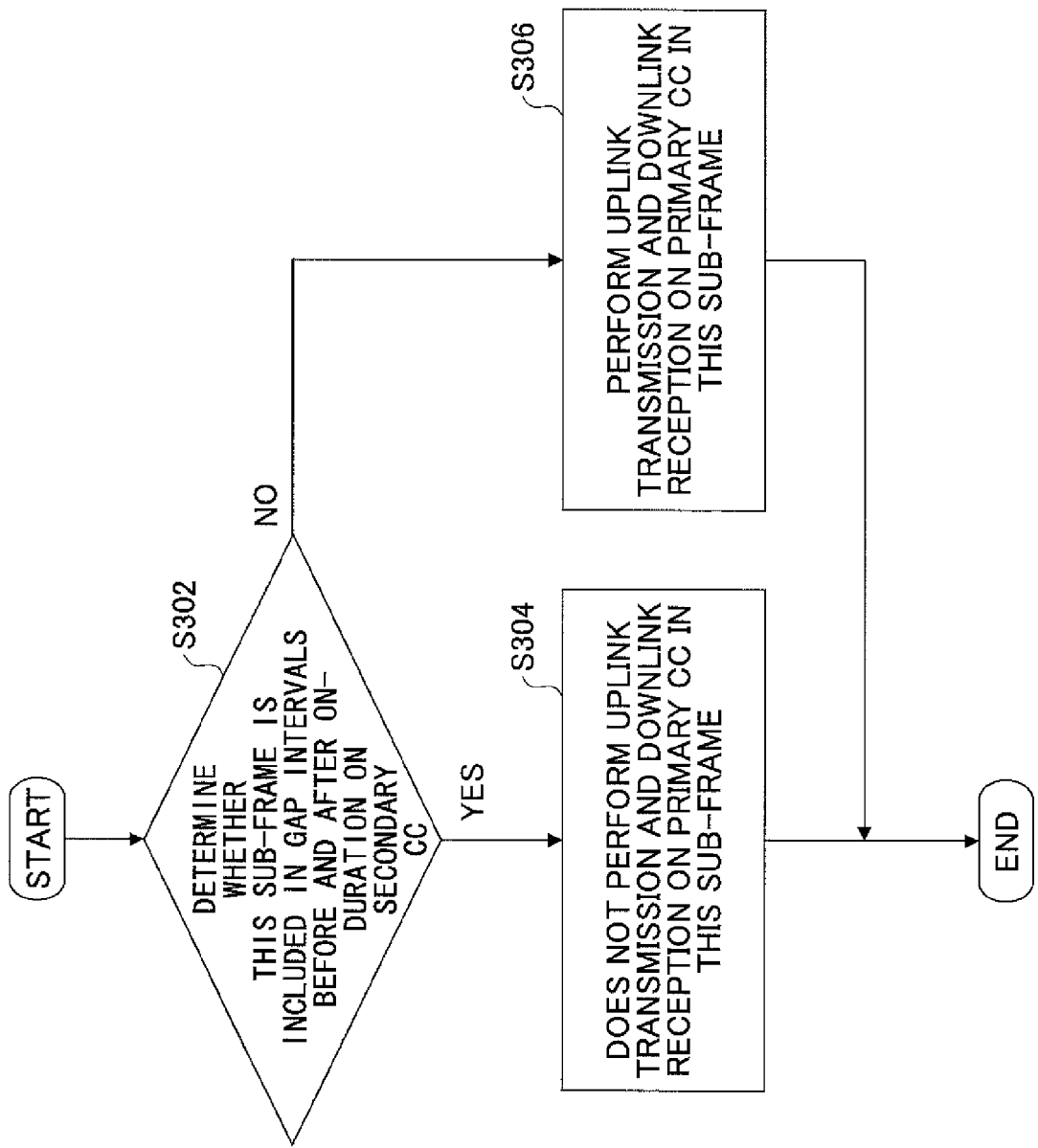
FIG. 9 shows a flowchart of a communication control method in a mobile station in accordance with an embodiment of the present invention.

With reference to FIG. 9, a communication control method in a mobile station UE in accordance with this embodiment is described below.

At step S302, the mobile station UE determines whether this sub-frame is included in gap intervals (i.e. gap intervals for the on-duration) before and after the on-duration on a secondary component carrier (Secondary CC). The Secondary CC corresponds to the second carrier as described above.

When this sub-frame is included in the gap intervals before and after the on-duration on the Secondary CC (step S302: YES), the mobile station UE does not perform uplink transmission and downlink reception on a primary component carrier (Primary CC) in this sub-frame (step S304). The Primary CC corresponds to the first carrier as described above.

When this sub-frame is not included in the gap intervals before and after the on-duration on the Secondary CC (step S302: NO), the mobile station UE performs uplink transmission and downlink reception on the Primary CC in this sub-frame as usual (step S306).

Figure 10:
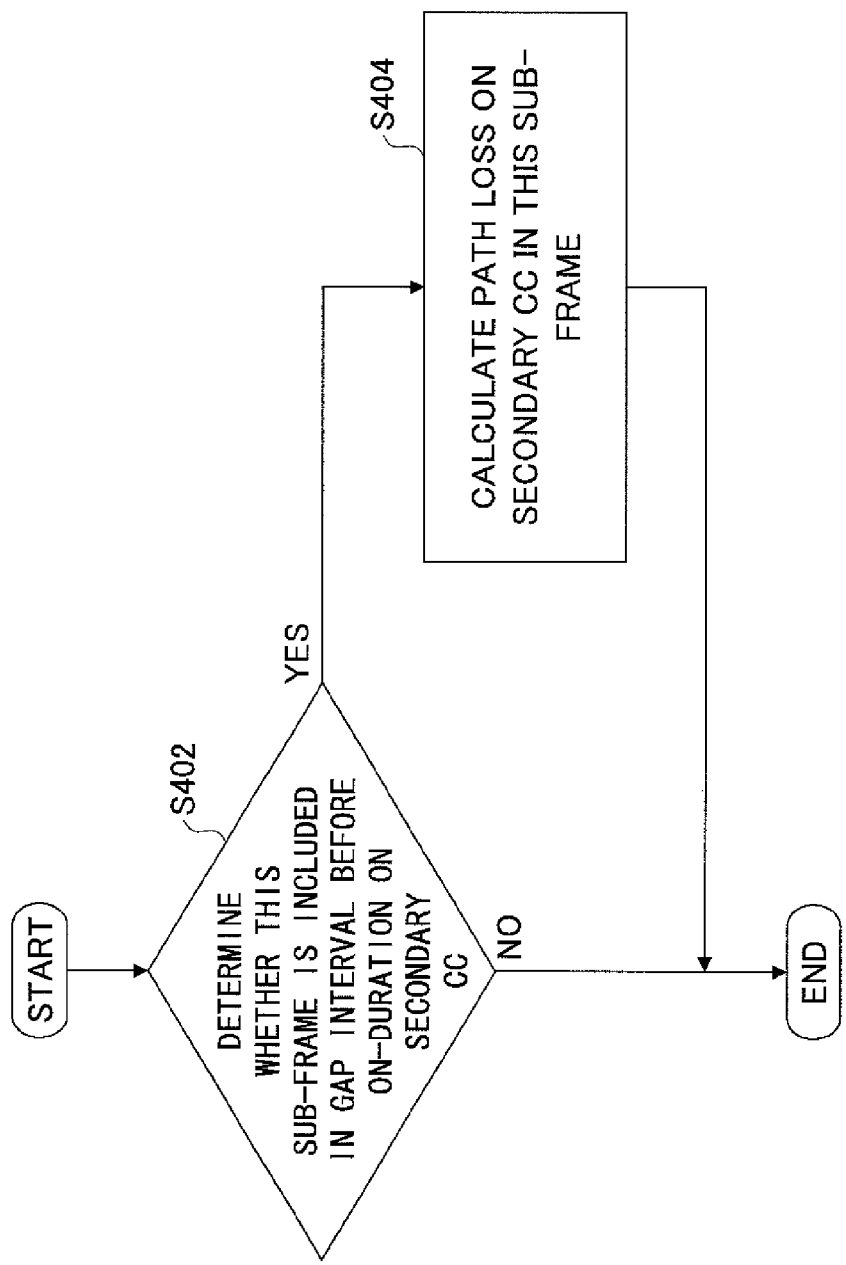
FIG. 10 shows a flowchart of another communication control method in a mobile station in accordance with an embodiment of the present invention.

With reference to FIG. 10, a communication control method in a mobile station UE in accordance with this embodiment is described below.

At step S402, the mobile station UE determines whether this sub-frame is included in a gap interval before the on-duration on the Secondary CC.

When this sub-frame is included in the gap interval before the on-duration on the Secondary CC (step S402: YES), the mobile station UE calculates a path loss on the Secondary CC in this sub-frame (step S404).

When this sub-frame is not included in the gap interval before the on-duration on the Secondary CC (step S402: NO), the mobile station UE calculates a path loss based on normal control operations (this step is not shown in the flowchart because this step corresponds to normal control operations). Although FIG. 10 shows that the path loss is calculated in step S404, cell search, measurement of RSRP, radio link monitoring, or the like may be alternatively performed.

Figure 11:
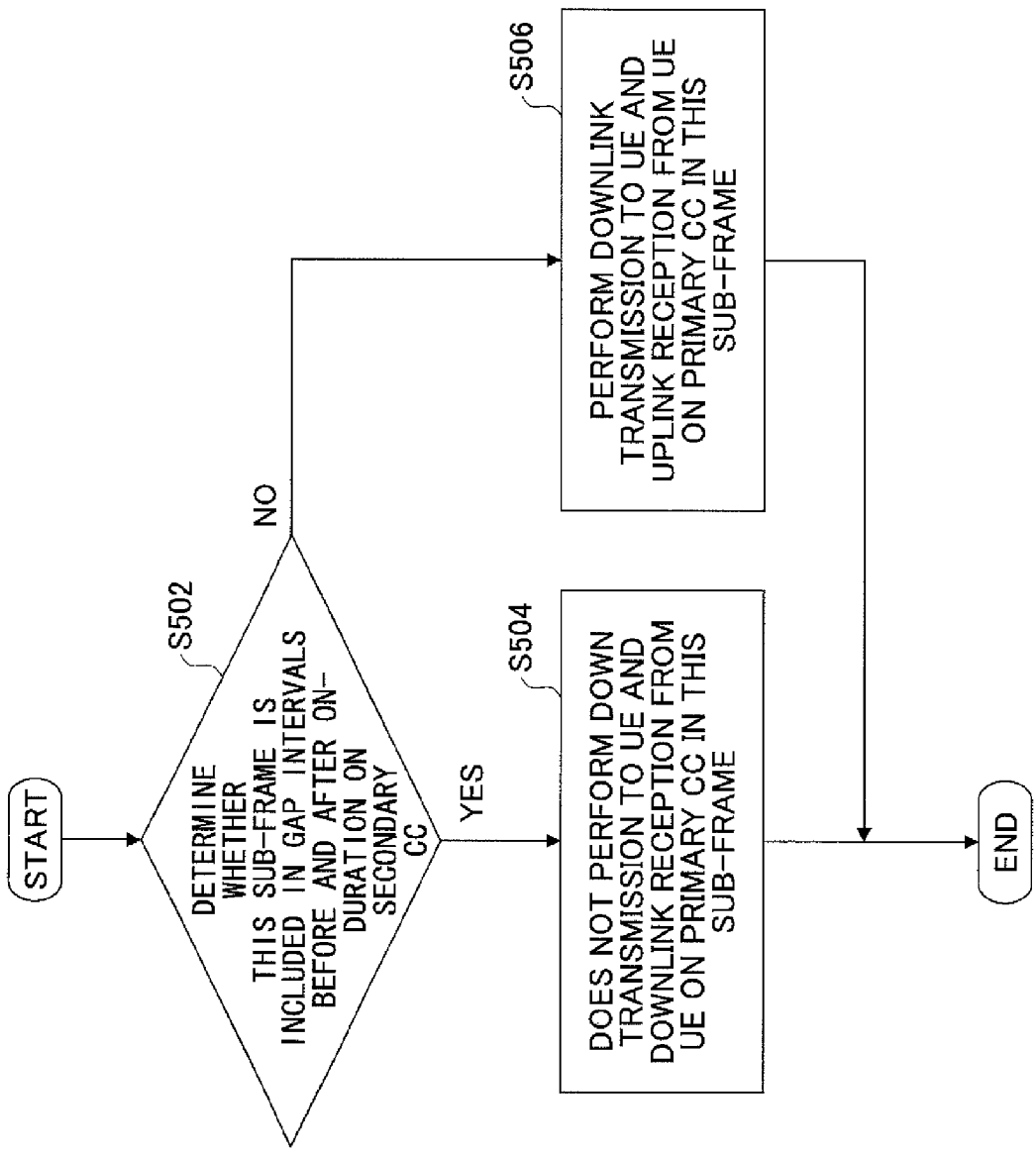
FIG. 11 shows a flowchart of a communication control method in a radio base station in accordance with an embodiment of the present invention.

With reference to FIG. 11, a communication control method in a radio base station eNB in accordance with this embodiment is described below.

At step S502, the radio base station eNB determines whether this sub-frame is included in gap intervals (i.e. gap intervals for the on-duration) before and after the on-duration on a secondary component carrier (Secondary CC) for a mobile station UE. The Secondary CC corresponds to the second carrier as described above.

When this sub-frame is included in the gap intervals before and after the on-duration on the Secondary CC for the mobile station UE (step S502: YES), the radio base station eNB does not perform uplink reception from the mobile station UE and downlink transmission to the mobile station UE on a primary component carrier (Primary CC) in this sub-frame (step S504). The Primary CC corresponds to the first carrier as described above.

When this sub-frame is not included in the gap intervals before and after the on-duration on the Secondary CC (step S502: NO), the radio base station eNB performs uplink reception from the mobile station UE and downlink transmission to the mobile station UE on the Primary CC in this sub-frame as usual (step S506).

Figure 12:
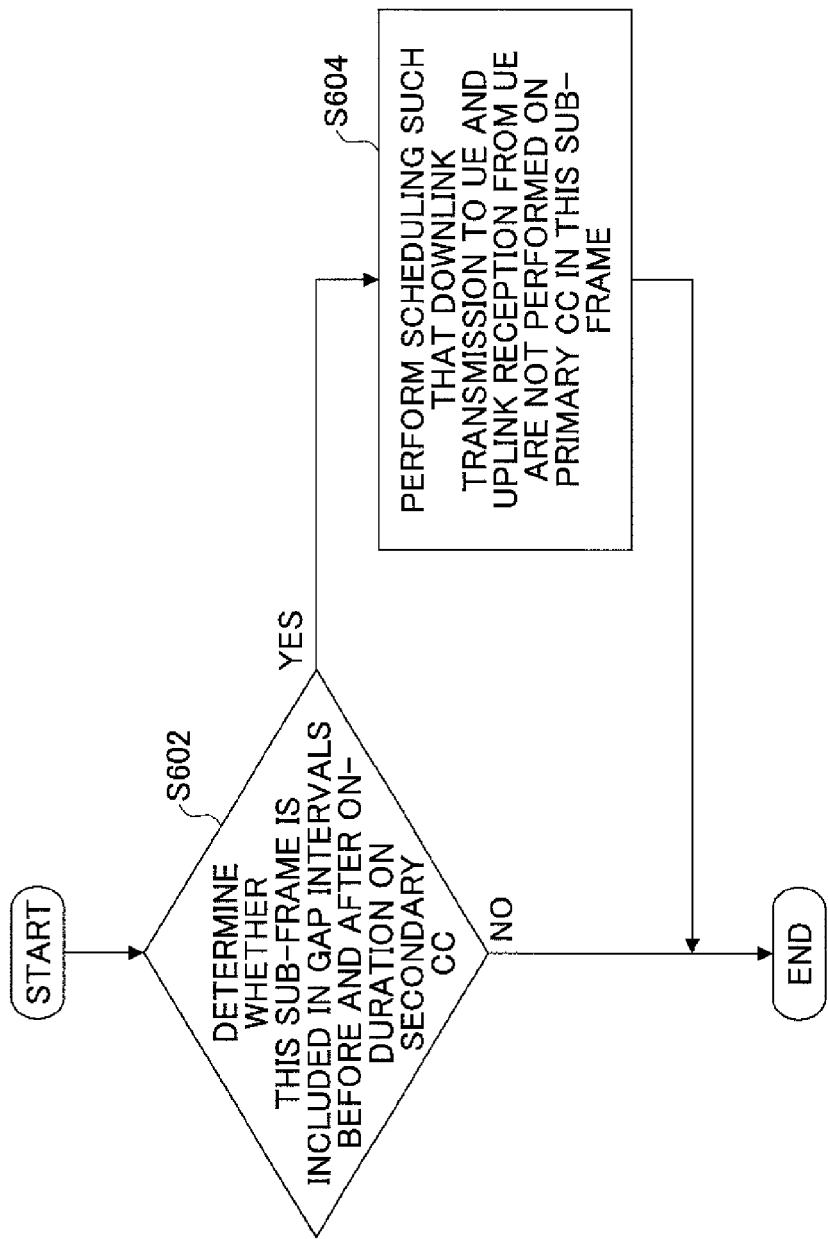
FIG. 12 shows a flowchart of another communication control method in a radio base station in accordance with an embodiment of the present invention.

With reference to FIG. 12, a communication control method in a radio base station eNB in accordance with this embodiment is described below.

At step S602, the radio base station eNB determines whether this sub-frame is included in gap intervals (i.e. gap intervals for the on-duration) before and after the on-duration on a secondary component carrier (Secondary CC) for a mobile station UE. The Secondary CC corresponds to the second carrier as described above.

When this sub-frame is included in the gap intervals before and after the on-duration on the Secondary CC (step S602: YES), the radio base station eNB performs scheduling such that downlink transmission to the mobile station UE and uplink reception from the mobile station UE are not performed on a Primary CC (step S604). The Primary CC corresponds to the first carrier as described above.

When this sub-frame is not included in the gap intervals before and after the on-duration on the Secondary CC (step S602: NO), the radio base station eNB performs uplink scheduling and downlink scheduling for the mobile station UE in this sub-frame as usual.

Although only the second carrier is in the DRX state in these examples, there may be plural carriers in the DRX state. For example, the first carrier may be in the Non-DRX state, and the second carrier and a third carrier may be in the DRX state. In this example, the on-duration on the second carrier is the same as (in common with) the on-duration on the third carrier. In other words, when there are plural component carriers in the DRX state, the on-duration on each component carrier may be the same.

Although these examples treat, as measurement gaps, intervals before and after the ON interval (on-duration) for DRX when the second carrier as the secondary component carrier is in the DRX state regarding the operations in the mobile station UE and the radio base station eNB, a measurement interval may be defined for measuring the second carrier when the second carrier as the secondary component carrier is in a de-activated state (i.e. the second carrier is not activated), and intervals before and after the measurement interval may be defined as measurement gaps. In this case, the first interval and the last interval during the measurement interval, rather than the intervals before and after the measurement interval, may be treated as measurement gaps. The measurement interval for measuring the second carrier may be applied only when the second carrier is in a de-activated state but not applied when the second carrier is in an activated state, in a similar manner to the ON interval (on-duration) for DRX.

In other words, a mobile station, a radio base station, and a communication control method in accordance with this embodiment are not limited to the case where the secondary component carrier is in the DRX state, but may be applied to the case where the secondary component carrier is in the de-activated state. In addition, a mobile station, a radio base station, and a communication control method in accordance with this embodiment are not limited to the case where the secondary component carrier is in the DRX state or in the Non-DRX state, but may be applied to the case where the secondary component carrier is in a state in which communications are always performed or in a state in which communications are intermittently performed. For example, the state in which communications are intermittently performed may include a state where monitoring of control signals, cell search, or measurement is intermittently performed and usual data communications are not performed.

Effects of a mobile station UE, a radio base station eNB, a communication control method in accordance with this embodiment are described below.

Treating the intervals before and after the on-duration on the second carrier in which DRX is applied as gap intervals equivalent to measurement gaps allows the radio base station eNB and the mobile station UE to explicitly suspend uplink and downlink communications on the first carrier. Thus, it is possible to avoid a situation where the mobile station UE loses packets while not managed by the radio base station eNB.

When the second carrier changes from the DRX state to the Non-DRX state, the on-duration is not provided in the Non-DRX state, and thus the accompanied gap durations are not provided. As a result, when both the first carrier and the second carrier are in the Non-DRX state, the loss of throughput due to the gap intervals can be reduced.

In addition, gap intervals suitable for discontinuous reception control can be defined compared to the conventional measurement gaps. By minimizing the length of the gap intervals, throughput on the first carrier can be improved.

Furthermore, by defining the interval before the on-duration longer than the interval after the on-duration, the mobile station UE can measure a path loss before the on-duration, and thus the accuracy of transmission power of uplink transmission in the on-duration can be improved.

Modified Embodiment

A modified embodiment of the present invention is described below in terms of a mobile station UE, a radio base station eNB, and a communication control method.

In this modified embodiment, a measurement interval for a secondary component carrier (SCC) including four intervals as shown in FIG. 13 is used, rather than the on-duration and the intervals before and after the on-duration as shown in FIGS. 5 and 6.

These four intervals may be referred to as a first interval, a second interval, a third interval, and a fourth interval in order of time. The measurement interval for the SCC is applied only when the second carrier is in the DRX state in a similar manner to the on-duration and the intervals before and after the on-duration as shown in FIGS. 5 and 6.

For example, the lengths of the first interval, the second interval, the third interval, and the fourth interval may be defined as 2 ms, 4 ms, 5 ms, and 2 ms, respectively. Alternatively, the lengths of the first interval, the second interval, the third interval, and the fourth interval may be defined as any value other than these values.

The first interval and the fourth interval of the measurement interval for the SCC is equal to the intervals before and after the on-duration as described above. In other words, the first interval and the fourth interval are treated as time intervals during which the receiver in the mobile station UE changes the center frequency or the like, and during which communications on the first carrier are not performed. Communications on the first carrier are not performed during the first interval and the fourth interval because the first interval and the fourth interval are treated as measurement gaps. In this manner, the radio base station eNB and the mobile station UE do not perform communications on the first carrier during the first interval and the fourth interval. For the same reason, communications on the second carrier are not performed during the first interval and the fourth interval.

The second interval and the third interval of the measurement interval for the SCC are equivalent to the on-duration from the viewpoint of the first carrier. During the second interval and the third interval, the receiver in the mobile station UE is in a state shown in FIG. 2 and communications on the first carrier are performed. In other words, the radio base station eNB and the mobile station UE perform communications on the first carrier during the second interval and the third interval. In this manner, the second interval and the third interval are treated as usual intervals rather than measurement gaps on the first carrier and communications on the first carrier are performed.

On the other hand, the second interval and the third interval are also equivalent to the on-duration from the viewpoint of the second carrier. However, when the second carrier is in the de-activation state, the mobile station UE performs measurement such as cell search, measurement (so-called measurement), and measurement of a path loss for the serving cell on the second carrier with a low frequency. It is preferable that measurement on the second carrier be performed again before communications in order to improve the accuracy of the measurement and improve communication quality. Thus, during the second interval of the measurement interval for the SCC, the mobile station UE performs measurement on the second carrier and communications on the second carrier are not performed between the mobile station UE and the radio base station eNB. In other words, the radio base station eNB and the mobile station UE do not perform communications on the second carrier during the second interval. Then, during the third interval of the measurement interval for the SCC, communications on the second carrier are performed. In other words, the radio base station eNB and the mobile station UE perform communications on the second carrier during the third interval. It should be noted that the mobile station UE may perform measurement on the second carrier during the third interval of the measurement interval for the SCC.

In this manner, during the second interval of the measurement interval for the SCC, the mobile station UE performs cell search, measurement (so-called measurement), and measurement of a path loss on the second carrier and does not perform uplink transmission and downlink reception on the second carrier. During the third interval of the measurement interval for the SCC, the mobile station UE performs uplink transmission and downlink reception on the second carrier. During the second interval of the measurement interval for the SCC, the radio base station eNB does not perform uplink reception and downlink transmission on the second carrier. During the third interval of the measurement interval for the SCC, the radio base station eNB performs uplink reception and downlink transmission on the second carrier.

Since measurement of a path loss as described above is not necessary for downlink communications, downlink communications may be performed during both the second interval and the third interval. In this case, only uplink communications are not performed during the second interval. In other words, during the second interval of the measurement interval for the SCC, the mobile station UE performs cell search, measurement (so-called measurement), measurement of a path loss, and downlink reception on the second carrier, but does not perform uplink transmission on the second carrier. During the third interval of the measurement interval for the SCC, the mobile station UE performs both uplink transmission and downlink reception on the second carrier. During the second interval of the measurement interval for the SCC, the radio base station eNB performs downlink transmission on the second carrier, but does not perform uplink reception on the second carrier. During the third interval of the measurement interval for the SCC, the radio base station eNB performs both uplink reception and downlink transmission on the second carrier.

In the modified embodiment, the on-duration is divided into two portions, one of which is used for measurement on the second carrier and the other of which is used for communications on the second carrier. Regarding the first carrier, both of the two portions formed by dividing the on-duration are used for communications on the first carrier. Communications on the second carrier may be transmission of uplink data signals triggered by an uplink scheduling grant or transmission of downlink data signals notified in downlink scheduling information. In this manner, whether communications are allowed in the measurement interval for the SCC may be determined by defining whether an uplink scheduling grant or downlink scheduling information is transmitted and also defining the first period, the second period, the third period, and the fourth period of the measurement interval for the SCC.

The features of the embodiments as described above may be expressed as follows.

(Item 1) A mobile station for communicating with a radio base station using two or more carriers, comprising:

where the two or more carriers include a carrier in a non-discontinuous reception state and a carrier in a discontinuous reception state, a first communicating unit configured to perform communications on the carrier in the non-discontinuous reception state; and a second communicating unit configured to perform communications on the carrier in the discontinuous reception state; wherein the first communicating unit treats intervals before and after an on-duration on the carrier in the discontinuous reception state as measurement gaps.

(Item 2) The mobile station as claimed in Item 1, wherein the first communicating unit comprises a first downlink receiving unit configured to perform downlink reception on the carrier in the non-discontinuous reception state;

a first uplink transmitting unit configured to perform uplink transmission on the carrier in the non-discontinuous reception state;

a first measuring unit configured to perform measurement on the carrier in the non-discontinuous reception state; and a first monitoring unit configured to perform radio link monitoring on the carrier in the non-discontinuous reception state; and the second communicating unit comprises a second downlink receiving unit configured to perform downlink reception on the carrier in the discontinuous reception state;

a second uplink transmitting unit configured to perform uplink transmission on the carrier in the discontinuous reception state;

a second measuring unit configured to perform measurement on the carrier in the discontinuous reception state; and a second monitoring unit configured to perform radio link monitoring on the carrier in the discontinuous reception state.

(Item 3) The mobile station as claimed in Item 1, wherein the carrier in the non-discontinuous reception state comprises at least one of a carrier in a state in which a parameter associated with discontinuous reception control is not configured, a carrier in a state in which a parameter associated with discontinuous reception control is configured and a timer for discontinuous reception control is in an operating state, a carrier in a state in which a parameter associated with discontinuous reception control is configured and a scheduling request is in a pending state, a carrier in a state in which a parameter associated with discontinuous reception control is configured and a timing for uplink HARQ retransmission is provided, and a carrier in a state in which a parameter associated with discontinuous reception control is configured and a downlink control signal for initial transmission destined for the mobile station is not received after a random access response for a specified preamble is received, the carrier in the discontinuous reception state comprises a carrier in a state other than these states.

(Item 4) The mobile station as claimed in Item 1, wherein
the measurement gap is a time interval provided for measuring a carrier with a different frequency or a carrier for a different radio communication system.

(Item 5) The mobile station as claimed in Item 1, wherein
the first communicating unit does not perform communications on the carrier in the non-discontinuous reception state during the intervals before and after the on-duration.

(Item 6) The mobile station as claimed in Item 2, wherein
the first uplink transmitting unit does not perform uplink transmission on the carrier in the non-discontinuous reception state during the intervals before and after the on-duration.

(Item 7) The mobile station as claimed in Item 1, wherein
regarding the intervals before and after the on-duration, the interval before the on-duration is longer than the interval after the on-duration.

(Item 8) A communication control method in a mobile station for communicating with a radio base station using two or more carriers, comprising:

where the two or more carriers include a carrier in a non-discontinuous reception state and a carrier in a discontinuous reception state, a first step of performing communications on the carrier in the non-discontinuous reception state; and a second step of performing communications on the carrier in the discontinuous reception state; wherein the first step comprises treating intervals before and after an on-duration on the carrier in the discontinuous reception state as measurement gaps.

(Item 9) A radio base station for communicating with a mobile station using two or more carriers, comprising:

where the two or more carriers include a carrier in a non-discontinuous reception state and a carrier in a discontinuous reception state, a first communicating unit configured to perform communications on the carrier in the non-discontinuous reception state; and a second communicating unit configured to perform communications on the carrier in the discontinuous reception state; wherein the first communicating unit treats intervals before and after an on-duration on the carrier in the discontinuous reception state as measurement gaps.

(Item 10) The radio base station as claimed in Item 9, wherein
the first communicating unit comprises a first downlink transmitting unit configured to perform downlink transmission on the carrier in the non-discontinuous reception state; and a first uplink receiving unit configured to perform uplink reception on the carrier in the non-discontinuous reception state; and the second communicating unit comprises a second downlink transmitting unit configured to perform downlink transmission on the carrier in the discontinuous reception state; and a second uplink receiving unit configured to perform uplink reception on the carrier in the discontinuous reception state.

(Item 11) The radio base station as claimed in Item 9, wherein
the first communicating unit does not perform communications on the carrier in the non-discontinuous reception state during the intervals before and after the on-duration.

(Item 12) The radio base station as claimed in Item 10, wherein
the first downlink transmitting unit performs uplink and downlink scheduling such that communications are not performed on the carrier in the non-discontinuous reception state.

(Item 13) The radio base station as claimed in Item 9, wherein
regarding the intervals before and after the on-duration, the interval before the on-duration is longer than the interval after the on-duration.

(Item 14) A communication control method in a radio base station for communicating with a mobile station using two or more carriers, comprising:

where the two or more carriers include a carrier in a non-discontinuous reception state and a carrier in a discontinuous reception state, a first step of performing communications on the carrier in the non-discontinuous reception state; and a second step of performing communications on the carrier in the discontinuous reception state; wherein the first step comprises treating intervals before and after an on-duration on the carrier in the discontinuous reception state as measurement gaps.

(Item 15) A mobile station for communicating with a radio base station using two or more carriers, comprising:

where the two or more carriers include a carrier in a non-discontinuous reception state and a carrier in a discontinuous reception state, a first communicating unit configured to perform communications on the carrier in the non-discontinuous reception state; and a second communicating unit configured to perform communications on the carrier in the discontinuous reception state; wherein the second communicating unit treats intervals before and after an on-duration on the carrier in the discontinuous reception state as measurement gaps and performs measurement on the carrier in the discontinuous reception state during the interval before the on-duration on the carrier in the discontinuous reception state.

The operations in the mobile station UE and the radio base station eNB as described above may be applied to a mobile station, a radio base station, or a control station in a system other than the LTE-Advanced system. For example, the operations may be applied to a mobile station, a radio base station, or a control station in an LTE system, a WCDMA system, a CDMA 2000 system, or a WiMAX system.

The operations in the mobile station UE and the radio base station eNB as described above may be implemented as hardware, a software module executed by a processor, or a combination of them.

The software module may be stored in a storage medium of any type, such as a random access memory (RAM), a flash memory, a read-only memory (ROM), an erasable programmable ROM (EPROM), an electronically erasable and programmable ROM (EEPROM), a register, a hard disk, a removable disk, or a CD-ROM.

The storage medium is connected to a processor in order for the processor to read and write information in the storage medium. Alternatively, the storage medium may be integrated in the processor. Alternatively, the storage medium and the processor may be included in an application specific integrated circuit (ASIC). The ASIC may be included in a mobile station UE and a radio base station eNB. Alternatively, the storage medium and the processor may be included in a mobile station UE and a radio base station eNB as a discrete component.

While the embodiments of the present invention have been described, a person skilled in the art clearly understands that the present invention is not limited to the embodiments described in the specification. The present invention can be modified or changed without departing from the intention and the scope of the present invention defined by the claims. Thus, the specification is provided for the purpose of illustration and should not be treated as limiting the present invention.

This international patent application is based on Japanese Priority Application No. 2010-113691 filed on May 17, 2010 and Japanese Priority Application No. 2010-118833 filed on May 24, 2010, the entire contents of which are incorporated herein by reference.

DESCRIPTION OF NOTATIONS

UE mobile station
102 first communicating unit
102A first downlink receiving unit
102B first uplink transmitting unit
102C first measuring unit
104A second downlink receiving unit
104B second uplink transmitting unit
104C second measuring unit
106 DRX control unit
108 gap control unit
eNB radio base station
202A first downlink transmitting unit
202B first uplink receiving unit
204A second downlink transmitting unit
204B second uplink receiving unit
206 DRX control unit
208 gap control unit

The invention claimed is:

1. A mobile station for communicating with a radio base station using two or more carriers, comprising:
where the two or more carriers include a carrier in a non-discontinuous reception state and a carrier in a discontinuous reception state,
a first communicating unit configured to perform communications on the carrier in the non-discontinuous reception state; and
a second communicating unit configured to perform communications on the carrier in the discontinuous reception state; wherein
the first communicating unit treats intervals before and after an on-duration on the carrier in the discontinuous reception state as intervals during which data transmission and reception are not performed,
wherein the carrier in the non-discontinuous reception state comprises at least one of
a carrier in a state in which a parameter associated with discontinuous reception control is not configured,
a carrier in a state in which a parameter associated with discontinuous reception control is configured and a timer for discontinuous reception control is in an operating state,
a carrier in a state in which a parameter associated with discontinuous reception control is configured and a scheduling request is in a pending state,
a carrier in a state in which a parameter associated with discontinuous reception control is configured and a timing for uplink HARQ retransmission is provided, and
a carrier in a state in which a parameter associated with discontinuous reception control is configured and a downlink control signal for initial transmission destined for the mobile station is not received after a random access response for a specified preamble is received,
the carrier in the discontinuous reception state comprises a carrier in a state other than these states.

2. The mobile station as claimed in claim 1, wherein
the first communicating unit comprises a first downlink receiving unit configured to perform downlink reception on the carrier in the non-discontinuous reception state;
a first uplink transmitting unit configured to perform uplink transmission on the carrier in the non-discontinuous reception state;
a first measuring unit configured to perform measurement on the carrier in the non-discontinuous reception state; and
a first monitoring unit configured to perform radio link monitoring on the carrier in the non-discontinuous reception state; and
the second communicating unit comprises a second downlink receiving unit configured to perform downlink reception on the carrier in the discontinuous reception state;
a second uplink transmitting unit configured to perform uplink transmission on the carrier in the discontinuous reception state;
a second measuring unit configured to perform measurement on the carrier in the discontinuous reception state; and
a second monitoring unit configured to perform radio link monitoring on the carrier in the discontinuous reception state.

3. The mobile station as claimed in claim 2, wherein the first uplink transmitting unit does not perform uplink transmission on the carrier in the non-discontinuous reception state during the intervals before and after the on-duration.

4. The mobile station as claimed in claim 1, wherein the first communicating unit does not perform communications on the carrier in the non-discontinuous reception state during the intervals before and after the on-duration.

5. A communication control method in a mobile station for communicating with a radio base station using two or more carriers, comprising:
where the two or more carriers include a carrier in a non-discontinuous reception state and a carrier in a discontinuous reception state,
a first step of performing communications on the carrier in the non-discontinuous reception state; and
a second step of performing communications on the carrier in the discontinuous reception state; wherein the first step comprises treating intervals before and after an on-duration on the carrier in the discontinuous reception state as intervals during which data transmission and reception are not performed, wherein the carrier in the non-discontinuous reception state comprises at least one of a carrier in a state in which a parameter associated with discontinuous reception control is not configured, a carrier in a state in which a parameter associated with discontinuous reception control is configured and a timer for discontinuous reception control is in an operating state, a carrier in a state in which a parameter associated with discontinuous reception control is configured and a scheduling request is in a pending state, a carrier in a state in which a parameter associated with discontinuous reception control is configured and a timing for uplink HARQ retransmission is provided, and a carrier in a state in which a parameter associated with discontinuous reception control is configured and a downlink control signal for initial transmission destined for the mobile station is not received after a random access response for a specified preamble is received, the carrier in the discontinuous reception state comprises a carrier in a state other than these states.

* * * * *